United States Patent
Milevski

(10) Patent No.: US 11,711,695 B2
(45) Date of Patent: *Jul. 25, 2023

(54) WIRELESS EARPIECES FOR HUB COMMUNICATIONS

(71) Applicant: BRAGI GmbH, Munich (DE)

(72) Inventor: Veniamin Milevski, Munich (DE)

(73) Assignee: BRAGI GMBH, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/675,200

(22) Filed: Feb. 18, 2022

(65) Prior Publication Data

US 2022/0174492 A1     Jun. 2, 2022

Related U.S. Application Data

(63) Continuation of application No. 16/128,429, filed on Sep. 11, 2018, now Pat. No. 11,272,367.
(Continued)

(51) Int. Cl.
*H04W 12/08* (2021.01)
*H04R 1/10* (2006.01)
(Continued)

(52) U.S. Cl.
CPC .......... *H04W 12/08* (2013.01); *H04R 1/1041* (2013.01); *H04R 1/1091* (2013.01);
(Continued)

(58) Field of Classification Search
CPC ............................. H04W 12/08; H04L 63/0861
See application file for complete search history.

(56) References Cited

U.S. PATENT DOCUMENTS 2,325,590 A   8/1943  Carlisle et al.
2,430,229 A   11/1947 Kelsey
(Continued)

FOREIGN PATENT DOCUMENTS

CN   204244472 U   4/2015
CN   104683519 A   6/2015
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — William S Powers
(74) *Attorney, Agent, or Firm* — Goodhue, Coleman & Owens, P.C.

(57) ABSTRACT

A method of utilizing wireless earpieces for hub communications in embodiments of the present invention may have one or more of the following steps: (a) activating the wireless earpieces, (b) connecting one or more devices to the wireless earpieces, (c) performing first biometric measurements of the user utilizing the wireless earpieces, (d) receiving second biometric measurements from the one or more devices, (e) determining if the one or more devices is located on the same user as the wireless earpieces by comparing the second biometric measurements to the first biometric measurements, (f) receiving a communication to be sent through the wireless earpieces from the one or more devices, and (g) sending the communication to reach a receiving party in response to the determination the second biometric measurements are similar to the first biometric measurements.

19 Claims, 9 Drawing Sheets

Related U.S. Application Data

(60) Provisional application No. 62/560,835, filed on Sep. 20, 2017.

(51) Int. Cl.
    *H04W 76/10*     (2018.01)
    *H04W 12/06*     (2021.01)
    *H04W 84/18*     (2009.01)
    *H04L 9/40*     (2022.01)
    *H04W 12/50*     (2021.01)

(52) U.S. Cl.
    CPC ........... *H04W 12/06* (2013.01); *H04W 76/10* (2018.02); *H04L 63/0861* (2013.01); *H04R 2201/107* (2013.01); *H04R 2420/07* (2013.01); *H04R 2460/03* (2013.01); *H04R 2460/07* (2013.01); *H04R 2460/13* (2013.01); *H04W 12/50* (2021.01); *H04W 84/18* (2013.01)

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,696,377 A | 10/1972 | Wall |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| 5,444,786 A | 8/1995 | Raviv |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,689,252 A | 11/1997 | Ayanoglu et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| 5,844,996 A | 12/1998 | Enzmann et al. |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,185,152 B1 | 2/2001 | Shen |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,522,266 B1 | 2/2003 | Soehren et al. |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,681,176 B2 | 1/2004 | Funk et al. |
| 6,690,807 B1 | 2/2004 | Meyer |
| 6,694,180 B1 | 2/2004 | Boesen |
| 6,718,043 B1 | 4/2004 | Boesen |
| 6,721,657 B2 | 4/2004 | Ford et al. |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| 7,532,901 B1 | 5/2009 | LaFranchise et al. |
| D601,134 S | 9/2009 | Elabidi et al. |
| 7,668,652 B2 | 2/2010 | Spencer et al. |
| 7,825,626 B2 | 11/2010 | Kozisek |
| 7,859,469 B1 | 12/2010 | Rosener et al. |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| 8,238,967 B1 | 8/2012 | Arnold et al. |
| 8,253,589 B2 | 8/2012 | Grimm et al. |
| D666,581 S | 9/2012 | Perez |
| 8,300,864 B2 | 10/2012 | Mullenborn et al. |
| 8,406,448 B2 | 3/2013 | Lin et al. |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |

(56) References Cited

U.S. PATENT DOCUMENTS

| | | | |
|---|---|---|---|
| 8,879,748 B2* | 11/2014 | Alam | H04L 12/00 |
| | | | 381/81 |
| 8,891,800 B1 | 11/2014 | Shaffer | |
| 8,994,498 B2 | 3/2015 | Agrafioti et al. | |
| D728,107 S | 4/2015 | Martin et al. | |
| 9,013,145 B2 | 4/2015 | Castillo et al. | |
| 9,037,125 B1 | 5/2015 | Kadous | |
| D733,103 S | 6/2015 | Jeong et al. | |
| 9,081,944 B2 | 7/2015 | Camacho et al. | |
| 9,135,208 B1* | 9/2015 | Huang | G06F 15/16 |
| 9,229,227 B2 | 1/2016 | Border et al. | |
| 9,317,241 B2 | 4/2016 | Tranchina | |
| 9,461,403 B2 | 10/2016 | Gao et al. | |
| 9,510,159 B1 | 11/2016 | Cuddihy et al. | |
| D773,439 S | 12/2016 | Walker | |
| D775,158 S | 12/2016 | Dong et al. | |
| 9,524,631 B1 | 12/2016 | Agrawal et al. | |
| D777,710 S | 1/2017 | Palmborg et al. | |
| 9,544,689 B2 | 1/2017 | Fisher et al. | |
| D788,079 S | 5/2017 | Son et al. | |
| 9,684,778 B2 | 6/2017 | Tharappel et al. | |
| 9,711,062 B2 | 7/2017 | Ellis et al. | |
| 9,729,979 B2 | 8/2017 | Özden | |
| 9,767,709 B2 | 9/2017 | Ellis | |
| 9,818,005 B2 | 11/2017 | Yeager et al. | |
| 9,821,767 B2 | 11/2017 | Nixon | |
| 9,848,257 B2 | 12/2017 | Ambrose | |
| 2001/0005197 A1 | 6/2001 | Mishra et al. | |
| 2001/0027121 A1 | 10/2001 | Boesen | |
| 2001/0043707 A1 | 11/2001 | Leedom | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0002705 A1 | 1/2003 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0102931 A1 | 5/2004 | Ellis et al. | |
| 2004/0160511 A1 | 8/2004 | Boesen | |
| 2005/0017842 A1 | 1/2005 | Dematteo | |
| 2005/0043056 A1 | 2/2005 | Boesen | |
| 2005/0094839 A1 | 5/2005 | Gwee | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0197063 A1 | 9/2005 | White | |
| 2005/0212911 A1 | 9/2005 | Marvit et al. | |
| 2005/0251455 A1 | 11/2005 | Boesen | |
| 2005/0266876 A1 | 12/2005 | Boesen | |
| 2006/0007151 A1* | 1/2006 | Ram | G06F 3/0395 |
| | | | 345/163 |
| 2006/0029246 A1 | 2/2006 | Boesen | |
| 2006/0073787 A1 | 4/2006 | Lair et al. | |
| 2006/0074671 A1 | 4/2006 | Farmaner et al. | |
| 2006/0074808 A1 | 4/2006 | Boesen | |
| 2006/0166715 A1 | 7/2006 | Engelen et al. | |
| 2006/0166716 A1 | 7/2006 | Seshadri et al. | |
| 2006/0220915 A1 | 10/2006 | Bauer | |
| 2006/0258412 A1 | 11/2006 | Liu | |
| 2007/0102009 A1 | 5/2007 | Wong et al. | |
| 2007/0239225 A1 | 10/2007 | Saringer | |
| 2007/0242834 A1 | 10/2007 | Coutinho et al. | |
| 2007/0247800 A1 | 10/2007 | Smith et al. | |
| 2007/0269785 A1 | 11/2007 | Yamanoi | |
| 2008/0013747 A1 | 1/2008 | Tran | |
| 2008/0076972 A1 | 3/2008 | Dorogusker et al. | |
| 2008/0090622 A1 | 4/2008 | Kim et al. | |
| 2008/0102424 A1 | 5/2008 | Holljes | |
| 2008/0146890 A1 | 6/2008 | LeBoeuf et al. | |
| 2008/0187163 A1 | 8/2008 | Goldstein et al. | |
| 2008/0215239 A1 | 9/2008 | Lee | |
| 2008/0253583 A1 | 10/2008 | Goldstein et al. | |
| 2008/0254780 A1 | 10/2008 | Kuhl et al. | |
| 2008/0255430 A1 | 10/2008 | Alexandersson et al. | |
| 2008/0298606 A1 | 12/2008 | Johnson et al. | |
| 2008/0318518 A1 | 12/2008 | Coutinho et al. | |
| 2009/0003620 A1 | 1/2009 | McKillop et al. | |
| 2009/0008275 A1 | 1/2009 | Ferrari et al. | |
| 2009/0017881 A1 | 1/2009 | Madrigal | |
| 2009/0041313 A1 | 2/2009 | Brown | |
| 2009/0073070 A1 | 3/2009 | Rofougaran | |
| 2009/0097689 A1 | 4/2009 | Prest et al. | |
| 2009/0105548 A1 | 4/2009 | Bart | |
| 2009/0154739 A1 | 6/2009 | Zellner | |
| 2009/0182913 A1 | 7/2009 | Rosenblatt et al. | |
| 2009/0191920 A1 | 7/2009 | Regen et al. | |
| 2009/0226017 A1 | 9/2009 | Abolfathi et al. | |
| 2009/0240947 A1 | 9/2009 | Goyal et al. | |
| 2009/0245559 A1 | 10/2009 | Boltyenkov et al. | |
| 2009/0261114 A1 | 10/2009 | McGuire et al. | |
| 2009/0296968 A1 | 12/2009 | Wu et al. | |
| 2009/0299215 A1 | 12/2009 | Zhang | |
| 2009/0303073 A1 | 12/2009 | Gilling et al. | |
| 2009/0304210 A1 | 12/2009 | Weisman | |
| 2010/0007805 A1 | 1/2010 | Vitito | |
| 2010/0033313 A1 | 2/2010 | Keady et al. | |
| 2010/0075631 A1 | 3/2010 | Black et al. | |
| 2010/0106356 A1 | 4/2010 | Trepagnier et al. | |
| 2010/0166206 A1 | 7/2010 | Macours | |
| 2010/0168075 A1 | 7/2010 | Dahlstrom et al. | |
| 2010/0203831 A1 | 8/2010 | Muth | |
| 2010/0210212 A1 | 8/2010 | Sato | |
| 2010/0285771 A1 | 11/2010 | Peabody | |
| 2010/0290636 A1 | 11/2010 | Mao et al. | |
| 2010/0320961 A1 | 12/2010 | Castillo et al. | |
| 2011/0018731 A1 | 1/2011 | Linsky et al. | |
| 2011/0103609 A1 | 5/2011 | Pelland et al. | |
| 2011/0137141 A1 | 6/2011 | Razoumov et al. | |
| 2011/0140844 A1 | 6/2011 | McGuire et al. | |
| 2011/0140956 A1 | 6/2011 | Henry et al. | |
| 2011/0221590 A1* | 9/2011 | Baker | H04Q 9/00 |
| | | | 340/539.12 |
| 2011/0239497 A1 | 10/2011 | McGuire et al. | |
| 2011/0286615 A1 | 11/2011 | Olodort et al. | |
| 2011/0293105 A1 | 12/2011 | Arie et al. | |
| 2012/0057740 A1 | 3/2012 | Rosal | |
| 2012/0155670 A1 | 6/2012 | Rutschman | |
| 2012/0159617 A1 | 6/2012 | Wu et al. | |
| 2012/0162891 A1 | 6/2012 | Tranchina et al. | |
| 2012/0163626 A1 | 6/2012 | Booij et al. | |
| 2012/0197737 A1 | 8/2012 | LeBoeuf et al. | |
| 2012/0235883 A1 | 9/2012 | Border et al. | |
| 2012/0309453 A1 | 12/2012 | Maguire | |
| 2013/0106454 A1 | 5/2013 | Liu et al. | |
| 2013/0154826 A1 | 6/2013 | Ratajczyk | |
| 2013/0178967 A1 | 7/2013 | Mentz | |
| 2013/0200999 A1 | 8/2013 | Spodak et al. | |
| 2013/0204617 A1 | 8/2013 | Kuo et al. | |
| 2013/0293494 A1 | 11/2013 | Reshef | |
| 2013/0316642 A1 | 11/2013 | Newham | |
| 2013/0343585 A1 | 12/2013 | Bennett et al. | |
| 2013/0346168 A1 | 12/2013 | Zhou et al. | |
| 2014/0002357 A1 | 1/2014 | Pombo et al. | |
| 2014/0004912 A1 | 1/2014 | Rajakarunanayake | |
| 2014/0010391 A1 | 1/2014 | Ek et al. | |
| 2014/0014697 A1 | 1/2014 | Schmierer et al. | |
| 2014/0020089 A1 | 1/2014 | Perini, II | |
| 2014/0072136 A1 | 3/2014 | Tenenbaum et al. | |
| 2014/0072146 A1 | 3/2014 | Itkin et al. | |
| 2014/0073429 A1 | 3/2014 | Meneses et al. | |
| 2014/0079257 A1 | 3/2014 | Ruwe et al. | |
| 2014/0106677 A1 | 4/2014 | Altman | |
| 2014/0122116 A1 | 5/2014 | Smythe | |

(56) References Cited

U.S. PATENT DOCUMENTS

| | | |
|---|---|---|
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0237518 A1 | 8/2014 | Liu |
| 2014/0270227 A1 | 9/2014 | Swanson |
| 2014/0270271 A1 | 9/2014 | Dehe et al. |
| 2014/0276227 A1 | 9/2014 | Pérez |
| 2014/0279889 A1 | 9/2014 | Luna |
| 2014/0310595 A1 | 10/2014 | Acharya et al. |
| 2014/0321682 A1 | 10/2014 | Kofod-Hansen et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |
| 2015/0124058 A1 | 5/2015 | Okpeva et al. |
| 2015/0141076 A1* | 5/2015 | Libin .............. H04W 4/60 455/557 |
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0310720 A1 | 10/2015 | Gettings et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree |
| 2015/0373467 A1 | 12/2015 | Gelter |
| 2015/0373474 A1 | 12/2015 | Kraft et al. |
| 2015/0379251 A1 | 12/2015 | Komaki |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0094550 A1 | 3/2016 | Bradley et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0226713 A1 | 8/2016 | Dellinger et al. |
| 2016/0253994 A1 | 9/2016 | Panchapagesan et al. |
| 2016/0324478 A1 | 11/2016 | Goldstein |
| 2016/0352818 A1 | 12/2016 | Han et al. |
| 2016/0353196 A1 | 12/2016 | Baker et al. |
| 2016/0360350 A1 | 12/2016 | Watson et al. |
| 2016/0364298 A1* | 12/2016 | Chiou .............. G11C 16/20 |
| 2017/0006359 A1* | 1/2017 | Nabetani .......... H04Q 9/00 |
| 2017/0021257 A1 | 1/2017 | Gilbert |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0065228 A1 | 3/2017 | Hirano |
| 2017/0078780 A1 | 3/2017 | Qian et al. |
| 2017/0078785 A1 | 3/2017 | Qian et al. |
| 2017/0096065 A1 | 4/2017 | Katsuno et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0119318 A1 | 5/2017 | Shay et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215011 A1* | 7/2017 | Goldstein .......... H04R 25/305 |
| 2017/0215016 A1 | 7/2017 | Dohmen et al. |
| 2017/0230752 A1 | 8/2017 | Dohmen et al. |
| 2017/0251295 A1 | 8/2017 | Pergament et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280222 A1* | 9/2017 | Boesen .............. G06F 3/011 |
| 2017/0280257 A1 | 9/2017 | Gordon et al. |
| 2017/0297430 A1 | 10/2017 | Hori et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1* | 1/2018 | Martin .............. H04R 1/1025 |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |

(56) References Cited

U.S. PATENT DOCUMENTS

| | | | |
|---|---|---|---|
| 2018/0034951 | A1 | 2/2018 | Boesen |
| 2018/0040093 | A1 | 2/2018 | Boesen |
| 2018/0042501 | A1 | 2/2018 | Adi et al. |
| 2018/0056903 | A1 | 3/2018 | Mullett |
| 2018/0063626 | A1 | 3/2018 | Pong et al. |

FOREIGN PATENT DOCUMENTS

| | | | |
|---|---|---|---|
| CN | 104837094 | A | 8/2015 |
| EP | 1469659 | A1 | 10/2004 |
| EP | 1017252 | A3 | 5/2006 |
| EP | 2903186 | A1 | 8/2015 |
| GB | 2074817 | | 11/1981 |
| GB | 2508226 | A | 5/2014 |
| JP | 06292195 | | 10/1998 |
| WO | 2008103925 | A1 | 8/2008 |
| WO | 2008113053 | A1 | 9/2008 |
| WO | 2007034371 | A3 | 11/2008 |
| WO | 2011001433 | A2 | 1/2011 |
| WO | 2012071127 | A1 | 5/2012 |
| WO | 2013134956 | A1 | 9/2013 |
| WO | 2014046602 | A1 | 3/2014 |
| WO | 2014043179 | A3 | 7/2014 |
| WO | 2015061633 | A2 | 4/2015 |
| WO | 2015110577 | A1 | 7/2015 |
| WO | 2015110587 | A1 | 7/2015 |
| WO | 2016032990 | A1 | 3/2016 |
| WO | 2016187869 | A1 | 12/2016 |

OTHER PUBLICATIONS

Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681 the whole document.
Announcing the $3,333,333 Stretch Goal (Feb. 24, 2014) pp. 1-14.
Ben Coxworth: "Graphene-based ink could enable low-cost, foldable electronics", "Journal of Physical Chemistry Letters", Northwestern University, (May 22, 2013), pp. 1-7.
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
Bragi Is on Facebook (2014), pp. 1-51.
Bragi Update—Arrival of Prototype Chassis Parts—More People—Awesomeness (May 13, 2014), pp. 1-8.
Bragi Update—Chinese New Year, Design Verification, Charging Case, More People, Timeline(Mar. 6, 2015), pp. 1-18.
Bragi Update—First Sleeves From Prototype Tool—Software Development Kit (Jun. 5, 2014), pp. 1-8.
Bragi Update—Let's Get Ready to Rumble, A Lot to Be Done Over Christmas (Dec. 22, 2014), pp. 1-18.
Bragi Update—Memories From April—Update on Progress (Sep. 16, 2014), pp. 1-15.
Bragi Update—Memories from May—Update on Progress—Sweet (Oct. 13, 2014), pp. 1-16.
Bragi Update—Memories From One Month Before Kickstarter—Update on Progress (Jul. 10, 2014), pp. 1-17.
Bragi Update—Memories From the First Month of Kickstarter—Update on Progress (Aug. 1, 2014), pp. 1-16.
Bragi Update—Memories From the Second Month of Kickstarter—Update on Progress (Aug. 22, 2014), pp. 1-15.
Bragi Update—New People @Bragi-Prototypes (Jun. 26, 2014), pp. 1-9.
Bragi Update—Office Tour, Tour to China, Tour to CES (Dec. 11, 2014), pp. 1-14.
Bragi Update—Status on Wireless, Bits and Pieces, Testing-Oh Yeah, Timeline(Apr. 24, 2015), pp. 1-18.
Bragi Update—The App Preview, The Charger, The SDK, Bragi Funding and Chinese New Year (Feb. 11, 2015), pp. 1-19.
Bragi Update—What We Did Over Christmas, Las Vegas & CES (Jan. 19, 2014), pp. 1-21.
Bragi Update—Years of Development, Moments of Utter Joy and Finishing What We Started(Jun. 5, 2015), pp. 1-21.
Bragi Update—Alpha 5 and Back to China, Backer Day, on Track(May 16, 2015), pp. 1-15.
Bragi Update—Beta2 Production and Factory Line(Aug. 20, 2015), pp. 1-16.
Bragi Update—Certifications, Production, Ramping Up (Nov. 13, 2015), pp. 1-15.
Bragi Update—Developer Units Shipping and Status(Oct. 5, 2015), pp. 1-20.
Bragi Update—Developer Units Started Shipping and Status (Oct. 19, 2015), pp. 1-20.
Bragi Update—Developer Units, Investment, Story and Status(Nov. 2, 2015), pp. 1-14.
Bragi Update—Getting Close(Aug. 6, 2015), pp. 1-20.
Bragi Update—On Track, Design Verification, How It Works and What's Next(Jul. 15, 2015), pp. 1-17.
Bragi Update—On Track, on Track and Gems Overview (Jun. 24, 2015), pp. 1-19.
Bragi Update—Status on Wireless, Supply, Timeline and Open House@Bragi(Apr. 1, 2015), pp. 1-17.
Bragi Update—Unpacking Video, Reviews on Audio Perform and Boy Are We Getting Close(Sep. 10, 2015), pp. 1-15.
Farr, Christina: "iPads in Every Hospital: Apple's Plan to Crack the $3 Trillion Health Care Sector", "https://www.fastcompany.com/3069060/artists-and-scientists-are-teaming-with-businesses-and-non-profits-on-gender-concerns" (Mar. 18, 2017).
Healthcare Risk Management Review, "Nuance updates computer-assisted physician documentation solution" (Oct. 20, 2016), pp. 1-2.
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017), pp. 1-8.
Hyundai Motor America, "Hyundai Motor Company Introduces a Health + Mobility Concept for Wellness in Mobility", Fountain Valley, Californa (2017), pp. 1-3.
International Search Report & Written Opinion, PCT/EP2016/070216 (dated Oct. 18, 2016) 13 pages.
International Search Report & Written Opinion, PCT/EP2016/070231 (dated Nov. 18, 2016) 12 pages.
International Search Report & Written Opinion, PCT/EP2016/070245 (dated Nov. 16, 2016) 10 pages.
International Search Report & Written Opinion, PCT/EP2016/070247 (dated Nov. 18, 2016) 13 pages.
International Search Report and Written Opinion, PCT/EP2016/070228 (dated Jan. 9, 2017) 13 pages.
Jain A et al: "Score normalization in multimodal biometric systems", Pattern Recognition, Elsevier, GB, vol. 38, No. 12, Dec. 31, 2005, pp. 2270-2285, XP027610849, ISSN: 0031-3203.
Last Push Before the Kickstarter Campaign Ends on Monday 4pm CET (Mar. 28, 2014), pp. 1-7.
Lovejoy: "Touch ID built into iPhone display one step closer as third-party company announces new tech", "http://9to5mac.com/2015/07/21/virtualhomebutton/" (Jul. 21, 2015).
Nemanja Paunovic et al, "A methodology for testing complex professional electronic systems", Serbian Journal of Electrical Engineering, vol. 9, No. 1, Feb. 1, 2012, pp. 71-80, XP055317584, Yu.
Nigel Whitfield: "Fake tape detectors, 'from the stands' footie and UGH? Internet of Things in my set-top box"; http://www.theregister.co.uk/2014/09/24/ibc_round_up_object_audio_dina_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.

(56) References Cited

OTHER PUBLICATIONS

Stretchgoal—It's Your Dash (Feb. 14, 2014), pp. 1-14.
Stretchgoal—The Carrying Case for the Dash (Feb. 12, 2014), pp. 1-9.
Stretchgoal—Windows Phone Support (Feb. 17, 2014), pp. 1-17.
The Dash + The Charging Case & The Bragi News (Feb. 21, 2014), pp. 1-12.
The Dash—A Word From Our Software, Mechanical and Acoustics Team + an Update (Mar. 11, 2014), pp. 1-7.
Update From Bragi—$3,000,000—Yipee (Mar. 22, 2014), pp. 1-11.
Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

\* cited by examiner

WIRELESS EARPIECES FOR HUB COMMUNICATIONS

This application is a continuation of U.S. Non-provisional patent application Ser. No. 16/128,429 filed on Sep. 11, 2018 which claims priority to U.S. Provisional Patent Application No. 62/560,835 filed on Sep. 20, 2017, both titled Wireless Earpieces for Hub Communications, all of which is hereby incorporated by reference in their entirety.

FIELD OF THE INVENTION

The embodiments relate to wearable devices. Particularly, the embodiments of the present invention relate to wearable devices and personal electronics having on board sensors. More particularly, but not exclusively, the embodiments of the present invention relate to wireless earpieces operating as a hub for personal electronics and wearable devices.

BACKGROUND

Wireless earpieces are a new class of consumer electronic devices with excellent growth potential. Wireless earpieces have focused on personal entertainment and communications. For example, wireless earpieces may be utilized with wearable devices, a cellular phone, and other personal electronics to perform communications, make phone calls, measure biometrics, and perform other processes. Thus far, wireless devices have not efficiently facilitated communications, process management, and information gathering between multiple devices.

Furthermore, another problem exists with making sure wearable devices are located on the user's body. If the wearable devices are located on the user's body, there can be issues with ensuring the wearable devices are properly located and/or positioned on the user's body. There are even additional issues with ensuring the wearable devices are located on the same body and not spread out over several users.

However, there remain multiple problems. The first of these problems involves the capture of the non-aligned datasets. For example, a smart shoe sensor may be able to produce powerful data on steps (e.g., a pedometer), but specific data from sensors detailing foot fall and gait analysis is outside the scope of any other sensor array away from the feet.

Second, there are issues around dealing with sensors within a body area network which have no "handshake" capability. For example, let's say a user is wearing a sensor having no basic interface with another device. If these devices were never designed or set up to communicate, then the data collected is useless to all other non-communicable device.

Third, currently there is no way to involve sensors adjacent to a body area network which might give relevant data through which better analysis of the collected data could be analyzed and ranked. For example, there may be an ambient temperature sensor in proximity to a body area network. It would be very useful in many cases to capture the ambient temperature of the environment around the body area network. This gives a specific frame of reference through which the body area network can be more thoroughly and accurately evaluated and analyzed. But if the temperature sensor was never designed nor set up to communicate with the body area network, then this data sits unused by the body area network.

Fourth, while devices may be able to receive other sensor data if the data is unable to be verified, because it is an unrelated device, then the data will once again remain unused.

SUMMARY

Therefore, it is a primary object, feature, or advantage of the present invention to improve over the state of the art.

A method of utilizing wireless earpieces for hub communications in embodiments of the present invention may have one or more of the following steps: (a) activating the wireless earpieces, (b) connecting one or more devices to the wireless earpieces, (c) performing first biometric measurements of the user utilizing the wireless earpieces, (d) receiving second biometric measurements from the one or more devices, (e) determining if the one or more devices is located on the same user as the wireless earpieces by comparing the second biometric measurements to the first biometric measurements, (f) receiving a communication to be sent through the wireless earpieces from the one or more devices, and (g) sending the communication to reach a receiving party in response to the determination the second biometric measurements are similar to the first biometric measurements.

A wireless earpiece in embodiments of the present invention may have one or more of the following features: (a) a processor for executing an application, and (b) a memory for storing the application, wherein the application is executed to, (i) activate the wireless earpieces, (ii) connect one or more devices to the wireless earpieces, (iii) perform first biometric measurements of the user utilizing the wireless earpieces, receive second biometric measurements from the one or more devices, and (iv) determine if the second biometric measurements and the first biometric measurements are similar.

A method for identifying sensor data in embodiments of the present invention may have one or more of the following steps: (a) activating a set of wireless earpieces, the set of wireless earpieces comprising: (i) an earpiece housing, (ii) a processor within the housing, (iii) sensors operatively coupled to the processor, the sensors configured to collect biometric data from a user, and (iv) a transceiver operatively coupled to the processor, the transceiver configured to communicate with a personal area network, (b) receiving communications from at least one device within the personal area network, (c) processing first biometric measurements from at least one sensor of the wireless earpiece, (d) processing second biometric measurements from the communications from the at least one device, (e) determining a signal-based similarity between the first biometric measurements and the second biometric measurements, (f) determining the at least one device and the wireless earpieces are worn by the same user if the signal-based similarity is present, (g) storing the second biometric measurements in a memory operatively coupled to the processor of the wireless earpieces, (h) communicating the second biometric measurements to a mobile device within the personal are network for storage, and (i) performing analysis of the second biometric measurements on software stored on the mobile device.

One or more of these and/or other objects, features, or advantages of the present invention will become apparent from the specification and claims that follow. No single embodiment need provide every object, feature, or advantage. Different embodiments may have different objects, features, or advantages. Therefore, the present invention is not to be limited to or by any objects, features, or advantages stated herein.

BRIEF DESCRIPTION OF THE DRAWINGS

Illustrated embodiments of the disclosure are described in detail below with reference to the attached drawing figures, which are incorporated by reference herein.

Figure 1:
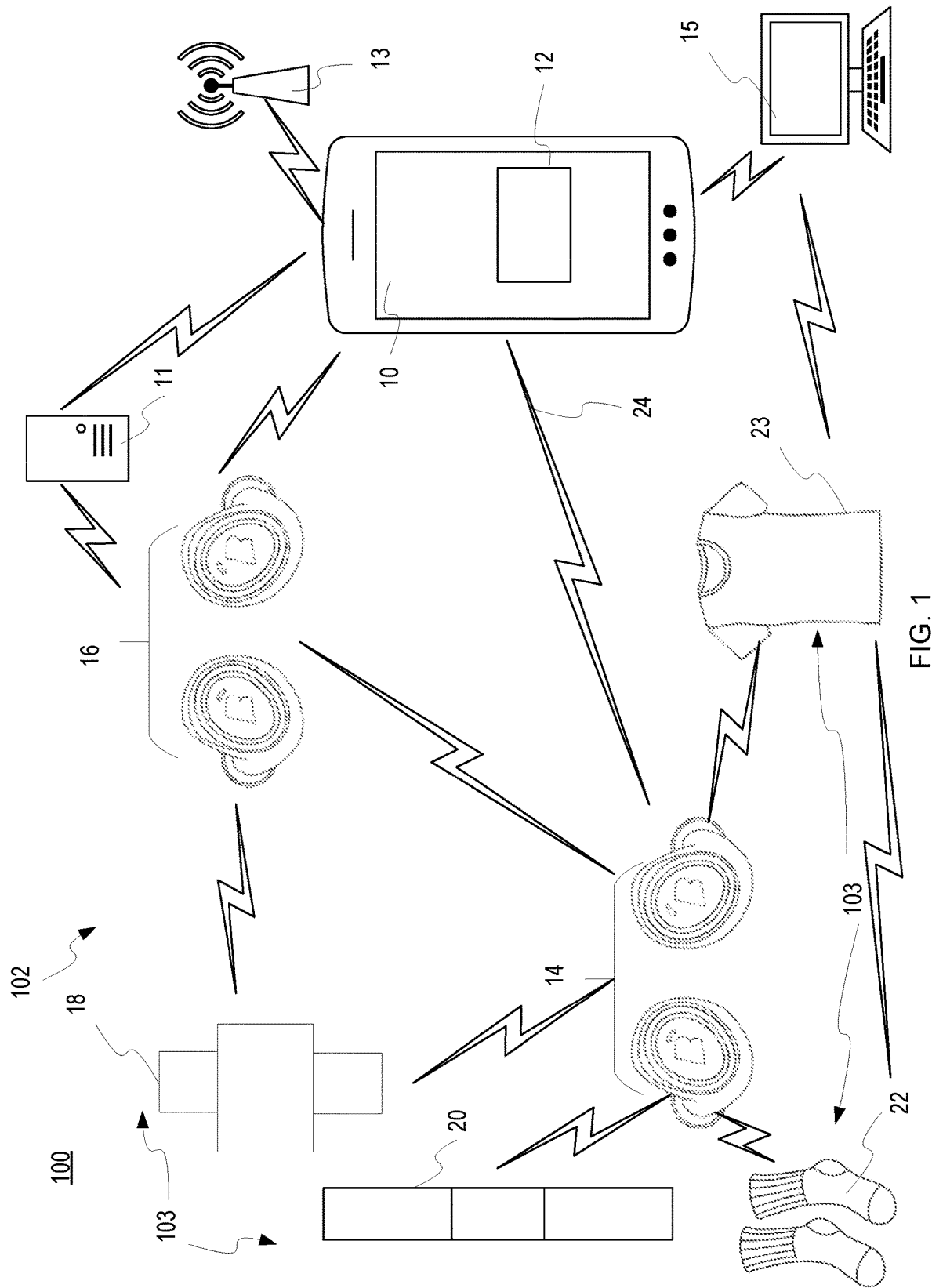
FIG. 1 illustrates a pictorial representation of a communications with wireless earpieces in accordance with an embodiment of the present invention.

Some of the figures include graphical and ornamental elements. It is to be understood that the illustrative embodiments contemplate all permutations and combinations of the various graphical elements set forth in the figures thereof.

DETAILED DESCRIPTION

The following discussion is presented to enable a person skilled in the art to make and use the present teachings. Various modifications to the illustrated embodiments will be clear to those skilled in the art, and the generic principles herein may be applied to other embodiments and applications without departing from the present teachings. Thus, the present teachings are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of body area networks and wearable electronic devices, it is fully contemplated embodiments of the present invention could be used in most any network and comprise most any electronic device without departing from the spirit of the invention.

It is an object, feature, or advantage of the present invention to provide a hub for communications between two or more wearable devices.

It is a still further object, feature, or advantage of the present invention to provide for a hub of a communications network to be a wearable device.

Another object, feature, or advantage is for the hub of a communications network to be one or more wireless earpieces.

Yet another object, feature, or advantage is the devices connecting to the hub are authenticated utilizing a first and second biometric measurement.

Another object, feature or advantage is a having a wireless earpiece which when activated takes a first biometric reading, connects one or more devices to the wireless earpiece, receives second biometric measurements from the one or more devices, and authenticates the one or more devices utilizing the first biometric measurements and the second biometric measurements.

Another object, feature or advantage is a personal area network of devices authenticated by a wireless earpiece.

Another object, feature or advantage is the ability to on-board or connect with sensor arrays meeting basic entry criteria.

Another object, feature or advantage is the ability to collect, store and analyze sensor data collected from multiple sensors all around a main hub.

Another object, feature or advantage is being able to onboard, communicate with or accept sensor data from wearable devices not originally set up to communicate and/or share date.

Another object, feature or advantage is to collect, communicate with and analyze sensor data from sensors adjacent to a body area network possibly providing relevant data through which better analysis of the collected data could be analyzed and ranked.

Another object, feature or advantage is to provide additional data to a body area network not having any real similarity to a basic sensor pack contained within the body area network or in a hub of the network.

Another object, feature or advantage is to provide a hub of a body area network having the capability to on-board other sensor data given a preset handshake with the hub.

Another object feature or advantage is to have the ability to bring sensor data into a system which is related to sensor data currently collected by the system, but unable to be verified by the system.

Another object, feature or advantage is to provide a 'signal-based similarity' to link devices together in a meshed body area network without requiring a user to do anything.

Another object, feature or advantage is to provide a hub for a body area network where sensor data from outside the hub is stored, or stored, authenticated and analyzed with the possibility for recommendations/utilizations on the hub device.

Another object, feature or advantage is to provide a hub for an area network where the sensor data from outside the hub is transferred to a linked device for storage, authentication, authorization and analysis and recommendations/utilizations on the linked device.

Another object, feature or advantage is allowing a user to give permission for an application to analyze the outside sensor data and add this data to a full repository of data from a local body area network.

A system, method, and wireless earpieces for hub communications are disclosed. When wireless earpieces are activated, one or more devices can connect to the wireless earpieces. First biometric measurements of the user are performed utilizing the wireless earpieces. Second biometric measurements are received from the one or more devices.

The one or more devices are authenticated utilizing the second biometric measurements and the first biometric measurements. Another embodiment provides wireless earpieces including a processor and a memory storing an application. The set of instructions are executed by the processor to perform the method described above.

The wireless earpiece may include a frame for fitting in an ear of a user. The wireless earpiece may also include a processor controlling functionality of the wireless earpiece. The wireless earpiece may also include several sensors performing first biometric measurements of at least the user. The wireless earpiece may also include a transceiver communicating with one or more devices proximate the user. The processor activates the wireless earpiece, connects one or more devices to the wireless earpiece, receives second biometric measurements from the one or more devices, and authenticates the one or more devices utilizing the first biometric measurements and the second biometric measurements.

The wireless earpiece and the one or more devices may be part of a personal area network. In one embodiment, the wireless earpieces receive communications from the one or more devices and send the communications in response to performing the biometric authentication. In one embodiment, the one or more devices represent personal electronics, such as smart wearables, smart phones, and smart clothing. In one embodiment, the one or more devices are vehicle sensors. In one embodiment, the authentication is performed by comparing the first biometric to the second biometric to determine both are associated with a user. In one embodiment, the first biometric and the second biometric represent one type of biometric measurement. In one embodiment, the biometric measurement represents a heart rate or blood pressure.

A system, method and wireless earpieces for performing communications and managing processes utilizing wireless earpieces as a hub are disclosed. The wireless earpieces may be utilized to directly or indirectly communicate discrete or real-time communications to other wireless earpieces or electronic devices. Hardware, logic, and operating system, a kernel, or an application executed by the wireless earpieces or an associated wireless device may control the communications including any confirmations, responses, or authorizations required to perform the initial or ongoing communications. The wireless earpieces may also authenticate other electronics utilizing biometrics. For example, the biometrics measured by the wireless earpieces may be utilized to authenticate other devices purportedly associated with the user. Any number of audio, visual, or tactile alerts, indicators, or alarms may be utilized to indicate communications are sent, received, in transmission, being received, or so forth. In one embodiment, hub communications with the wireless earpieces may be performed utilizing a wireless personal area network, body area network, body sensor network, or a personal hub network centered on the wireless earpieces.

The wireless personal area network may be automatically created between the wireless earpieces and other devices. For example, user preferences, settings, permissions, or other configuration information associated with each of the wireless earpieces may be utilized to establish and utilize the wireless personal area network. The wireless personal area network may also be created based on user input linking separate wireless earpieces, users, wireless devices, or other electronics. For example, the wireless earpieces may be linked utilizing one or more user names, pin numbers, passwords, network names, IMEIs, IP addresses, user biometrics, locations, events, environments, or other device/user identifiers. To further illustrate, biometrics determined by the wireless earpieces may be utilized to verify other wearables or other electronics purporting to be associated with the user/wireless earpieces.

Multiple wireless earpieces may be utilized to create a wireless personal area network of sensors or sensor array. The wireless earpieces may be able to create a three-dimensional sound environment or re-creation. In other embodiments, additional sensors of the wireless earpieces may be utilized to create a visual, thermal, pressure, radiation, or other three-dimensional image, view, re-creation, visual, display, graphic, or other content. For example, the wireless personal area network may also determine if users wearing wireless earpieces within a specified area or environment suddenly experience an increase in monitored biometrics or conditions, such as heart rate, blood pressure, temperature, or so forth. The sensor array may be utilized for enhancing user experiences (e.g., entertainment, received content, etc.), safety, security, crowd control, and so forth.

The wireless earpieces may communicate with any number of wearable or other electronics to provide information to the user. The wireless personal area network may be created or utilized as needed with the individual wireless earpieces (or sets of wireless earpieces), wireless devices, or other electronics acting as nodes within the mesh network 100. The communications and sensor mesh networks may be utilized for any number of personal, commercial, organizational, military, and other purposes.

FIG. 1 illustrates a pictorial representation of a wireless personal area network 100 in accordance with an embodiment of the present invention. Wireless personal area network 100, a hub system 102 including a wireless device 10, a software application 12 executable on the wireless device 10, and a set of wireless earpieces 14, 16 worn by one or more users. The wireless earpieces 14, 16 may reference a set of wireless earpieces which may include, a left wireless earpiece and/or a right wireless earpiece. Correspondingly, references herein to wireless earpieces or a wireless earpiece may refer to a set of wireless earpieces and/or an individual wireless earpiece. In one embodiment, the wireless device 10 may represent a mobile phone, a tablet, a laptop, a desktop computer, augmented reality system, virtual reality system, or any other type of electronic device capable of both receiving user input and interacting with outside electronic devices.

As shown, the wireless earpieces 14 may be the hub for the other electronics in the hub system 102. The various types of electronic or smart devices 103 of the wireless personal area network 100 may include, but are not limited to, a smart watch 18, a smart wristband 20, smart socks 22, and a smart shirt 23. In one embodiment, the devices 103 may be utilized by a single user. For example, the wireless earpieces 14 may represent a primary set of wireless earpieces worn by the user and the wireless earpieces 16 may represent a secondary pair of wireless earpieces worn or utilized as needed or swapped out with the wireless earpieces 14 in response to low batteries, damage, hardware or software failures, or so forth. The software application 12 executable on the wireless device 10 may be either stored on the wireless device 10 or may be directly accessible from an outside or third-party electronic device, such as a server 11, a communications tower 13, a portable memory device, or a computing device such as a tablet, a desktop computer 15, or a laptop. For example, only a portion of the software application 12 may be executed on the wireless device 10 to function. The software application 12 may also be executed by any of the devices 103 of the system 102. The software application 12 may be programmed to send communications or requests through the wireless hub system 102. The software application 12 may represent a program, an operating system, a kernel, a module, a script, an application, or other software. The software application 12 may also be executed by the wireless earpieces 16. As described, software applications, logic, or hardware utilized by the wireless earpieces or devices 103 may be used.

Communications within the wireless personal area network 100 may be communicated directly between the devices 103 or through one or more intermediary electronic devices, such as a router, repeater, communications tower 13, a satellite, a server, or another computing device capable of receiving radio frequency, electromagnetic, or other wireless signals before reaching the wireless earpieces 14 (as the destination or for additional routing). The communication request may be directed to additional wireless earpieces (e.g., wireless earpieces 16) or other types of electronic devices used, worn, or carried by a user or third parties. The wireless personal area network 100 may also represent a wireless body area network (B.A.N.) a personal area network, an IoT (internet of things) network or a mesh network without departing from the spirit of the invention. Furthermore, network 100 may incorporate edge computing technology for optimizing applications or cloud computing systems by taking some portion of an application, its data, or services away from one or more central nodes (the "core") to the other logical extreme (the "edge") of the network which contacts the physical world or end users.

More than one user utilizing wireless earpieces 14 may connect to the wireless device 10 beyond the wireless earpieces 14 as are shown in FIG. 1. The devices 103 may represent any number of mobile phones, tablets, laptops, desktop computers, smart glasses, smart jewelry, eyepieces, and watches.

Gestures used with the wireless earpiece 14, 16 to receive a communication or communication information (e.g., commands, messages, requests, alerts, etc.), establish a link, or otherwise provide feedback or input may include head gestures, hand gestures, finger gestures, tapping gestures, swiping gestures, or any sort of tactile input or gesture sensed by the wireless earpiece 14, 16 and more than one type of gesture may be used. In another embodiment, the wireless earpiece 14, 16 may receive verbal or audio commands to implement an action. Visual, audio, or other media recorded or stored by a second electronic device, such as a smartphone, a camcorder, a digital camera, or electronic eyewear, operatively connected to one or more wireless earpieces 14, 16 worn by one or more third parties, may be communicated by one or more third parties wearing the wireless earpieces 14 or the wireless device 10. The communications sent and received by the hub system 102 may include voice, text, alerts, packets, images, audio, biometrics, email, readings, or so forth whether measured by the wireless earpieces 14 or received from an associated user or connected device.

The wireless earpieces 14 may be separated to perform communications with each other (e.g., a left wireless earpiece given to a first user and a right wireless earpiece given to a second user). The wireless earpieces 14 may communicate utilizing any number of standards, protocols, or signals. The utilization of the wireless earpieces 14 may allow a user to further expand the scope or reach of the wireless personal area network 100 of the system 102 without additional devices being required or necessary. In one embodiment, the wireless device 10 may be utilized as a repeater, booster, node, ranger extender or intermediary for relaying communications between the wireless earpieces 14. The wireless earpieces 14 may be utilized for sporting events or competitions, work environments, team exercises, organizations, military units, emergency responders, and so forth.

The software 12 may include a graphical user interface displayed by the wireless device 10. The graphical user interface may allow a user to select whether the wireless earpieces 12, 14 (or associated devices 103) participate in communications through the wireless personal area network 100. The software 12 may enable different types of wireless personal area network communications, queueing, user preferences, parameters, configurations, icons, alerts, or so forth. Input may be provided to the wireless device 10 utilizing any number of touch screens, buttons, knobs, scroll wheels, or so forth.

The smart socks 22 and the smart shirt 23 are clothing including any number of wearable biometric sensors measuring heart rate, perspiration, movement, blood oxygenation, impacts, cadence (e.g., walking, jogging, running, swimming, biking, etc.), stresses, and so forth.

The wireless earpieces 14 may act as a communications hub for routing all sensor data or other feedback to a selected device, such as the wireless device 10 or the smart watch 18. For example, sensor data streamed to the wireless earpieces 14 may then be routed to the wireless device 10 for archival or storage. The wireless earpieces 14 may automatically function as a hub for the devices 103 outputting a signal (e.g., sensor reading) to be read by nearby devices. The wireless earpieces 14 may verify one or more identifiers or user biometrics to ensure the wireless earpieces 14 should receive, route, or otherwise process communications from the devices 103.

Figure 2:
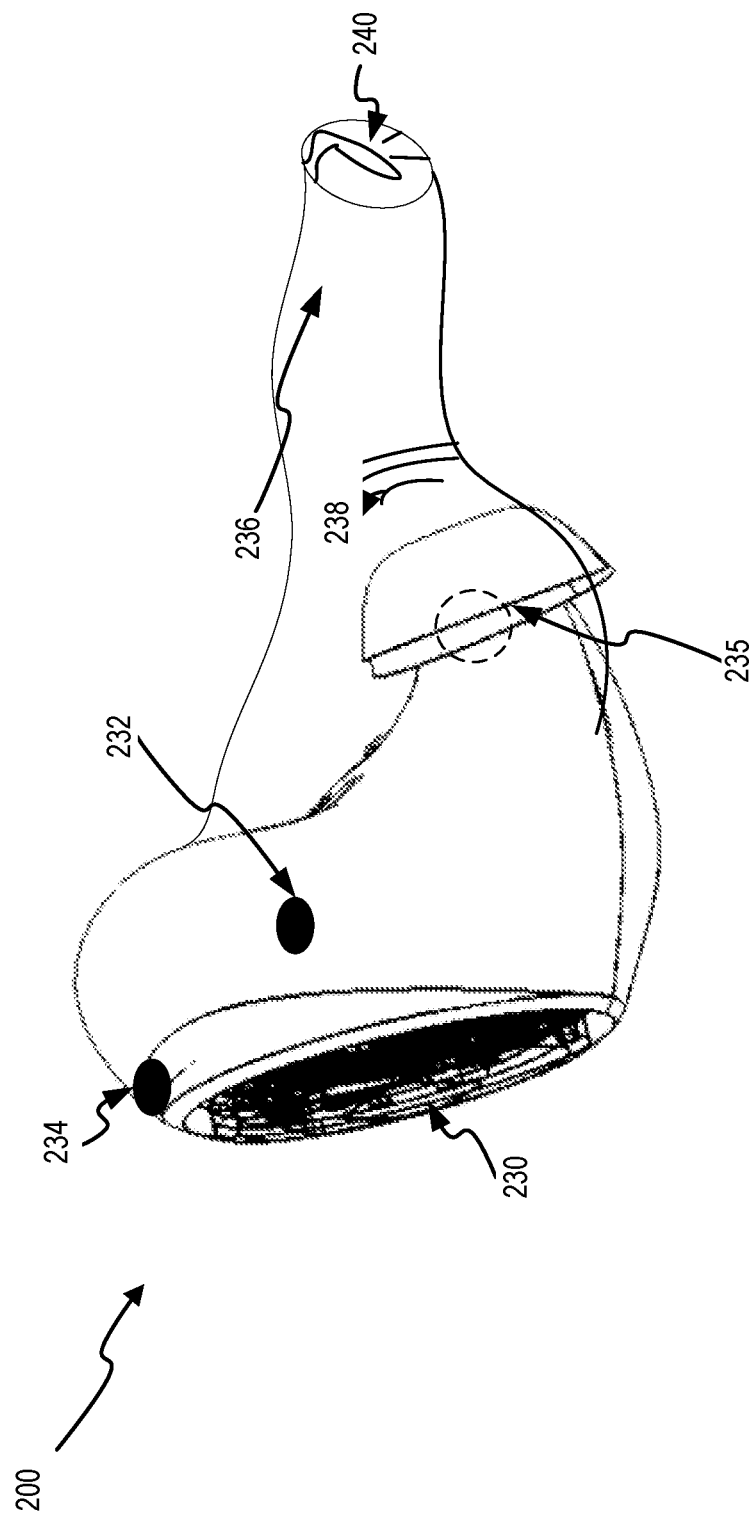
FIG. 2 illustrates a right wireless earpiece of a wireless earpiece set as it relates to a user's right ear in accordance with an embodiment of the present invention.

FIG. 2 illustrates a right wireless earpiece 200 of a wireless earpiece set as it relates to a user's right ear in accordance with an embodiment of the present invention. The user may interact with the right wireless earpiece 200 by either providing a gesture sensed by a gesture interface 230, a voice command sensed via a microphone 232, or by one or more head or neck motions which may be sensed by an inertial sensor 234 such as a MEMS gyroscope, magnetometer, or an accelerometer. In one embodiment, the gesture interface 230 may include one or more optical sensors, touch/capacitive sensors, or so forth. The microphone 232 may represent one or more over-air or bone conduction microphones. The air-based microphone may be positioned on an exterior of the right wireless earpiece 200 when worn by the user (e.g., on or near the gesture interface 230). The bone conduction microphone may be positioned on an interior portion of the right wireless earpiece 200 to abut the skin, tissues, and bones of the user.

The right wireless earpiece 200 may also include one or more speakers 235. The speakers 235 may be positioned in an area/location conducive for communicating sounds to the tympanic membrane 240 of the user's ear and may include components, such as bass speakers, mid-range speakers, tweeters speakers, digital-to-analog converters, amplifiers, attenuators, filters, and/or other components necessary for speakers 235 to convert an electrical signal into a sound wave 238. The components of speakers 235 may be further configured and/or programmed to generate three-dimensional stereo sound or to generate sounds at specific frequencies. Speakers 235 may communicate verifications regarding devices in connection with or communicating through the right wireless earpieces 200. As a result, the wearer of the right wireless earpiece 200 may be informed regarding the hub activities and processes performed by the right wireless earpiece 200.

For example, if a user wearing the right wireless earpiece 200 wishes to transcribe and send a text message through the wireless earpiece the user may give a voice command to specify a recipient and the message to be communicated utilizing the microphone 232, once read back or otherwise verified, the user may nod his head, which may be sensed by the inertial sensor 234, such as an accelerometer, via voltage changes due to capacitance differentials caused by the nodding of the head to send the text message through a wireless personal area network 100. In addition, the user may tap on or swipe across the gesture interface 230 to bring up a menu in which to send, for example, a preprogrammed reply. The gesture interface 230 may also be utilized to accept one or more pieces of media a third party wishes to share with the user wearing the right wireless earpiece 200.

The user may also wish to control which parties receive a communication or transmission by accessing a second menu via an additional gesture, such as a voice command or a finger swipe, to determine which parties receive the communication. As noted, voice communications, commands, or audio content to be transcribed may be received via the microphone 232. The right wireless earpiece 200 may be positioned within the ear canal 236 to minimize the distance between the right wireless earpiece 200 and the user's tympanic membrane 240 so any sound communications 238 received from the user are effectively received through the microphone 232.

Figure 3:
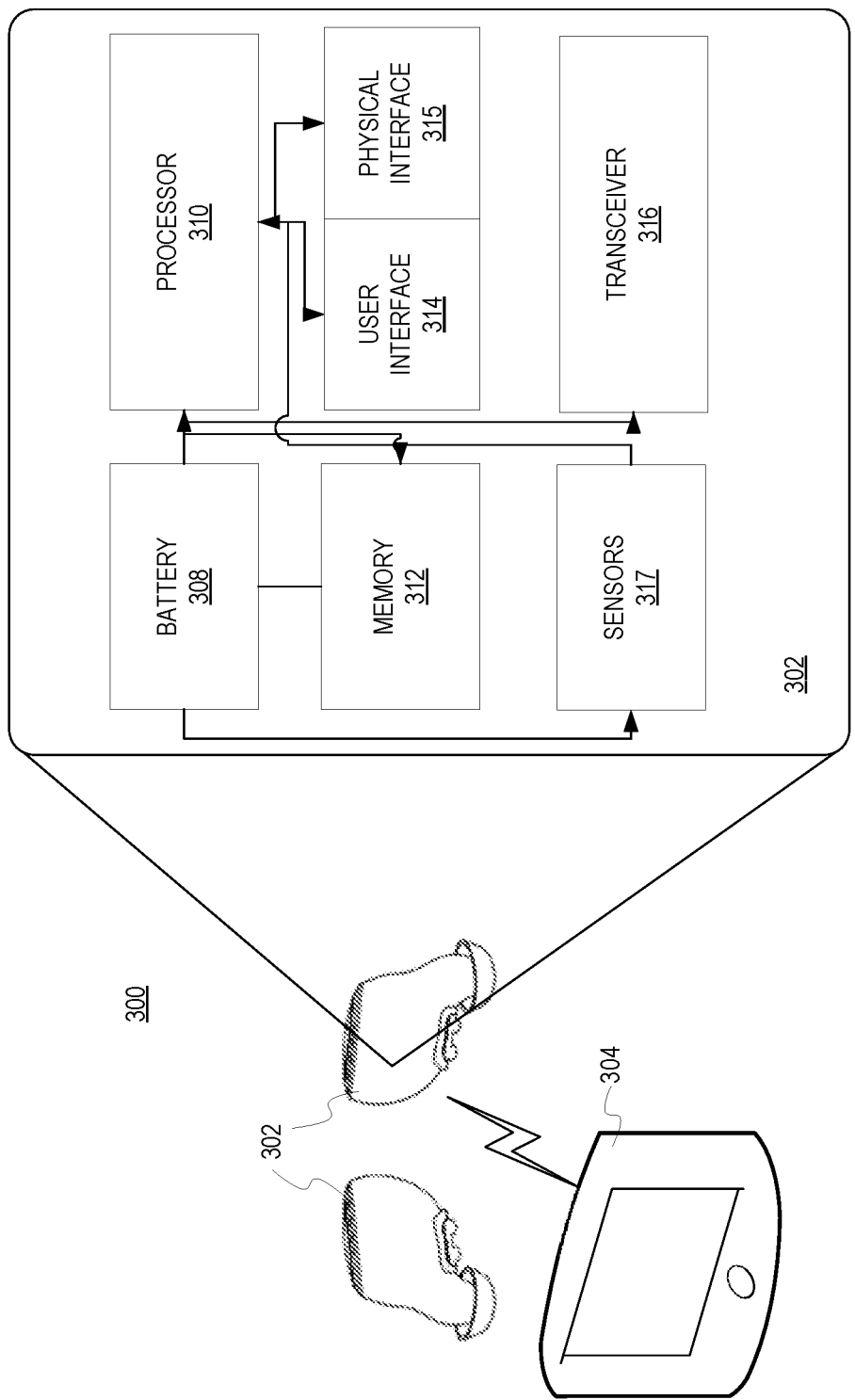
FIG. 3 is a block diagram of a wireless earpiece system in accordance with an embodiment of the present invention

FIG. 3 is a block diagram of a wireless earpiece system 300 in accordance with an illustrative embodiment. As previously noted, the wireless earpieces 302 may be referred to or described herein as a pair (wireless earpieces) or singularly (wireless earpiece). The description may also refer to components and functionality of each of the wireless earpieces 302 collectively or individually. The wireless earpiece system 300 may enhance communications and functionality of the wireless earpieces 302. The wireless earpiece system 300 or wireless earpieces 302 may be part of a wireless personal area network 100 (e.g., sending device, receiving device, hub or node in the wireless personal area network, etc.).

As shown, the wireless earpieces 302 may be wirelessly linked to the wireless device 304. For example, the wireless device 304 may represent a smart phone 10. The wireless device 304 may also represent a gaming device, tablet computer, vehicle system (e.g., GPS, speedometer, pedometer, entertainment system, etc.), media device, smart watch, laptop, smart glass, or other electronic devices. User input, commands, and communications may be received from either the wireless earpieces 302 or the wireless device 304 for implementation on either of the devices of the wireless earpiece system 300 (or other externally connected devices). The wireless earpieces 302 may communicate with any number of devices, simultaneously, concurrently, or sequentially based on the applicable circumstances and environment.

The wireless device 304 may act as a logging tool for receiving information, data, or measurements made by the wireless earpieces 302. For example, the wireless device 304 may download data from the wireless earpieces 302 in real-time. As a result, the wireless device 304 may be utilized to store, display, and synchronize data for the wireless earpieces 302 as well as manage communications. For example, the wireless device 304 may display pulse, proximity, location, oxygenation, distance, calories burned, and so forth as measured by the wireless earpieces 302. The wireless device 304 may be configured to receive and display an interface, selection elements, and alerts indicating conditions to implement personal area communications. For example, the wireless earpieces 302 may utilize factors, such as changes in motion or light, distance thresholds between the wireless earpieces 302 and/or wireless device 304, signal activity, user orientation, user speed, user location, environmental factors (e.g., temperature, humidity, noise levels, proximity to other users, etc.) or other automatically determined or user specified measurements, factors, conditions, or parameters to implement various features, functions, and commands. The wireless device 304 may function as the hub for the communications received through the wireless earpieces 302. Other wireless devices, such as a smart watch, may function as the hub or logging device.

The wireless device 304 may also include any number of optical sensors, touch sensors, microphones, and other measurement devices providing feedback or measurements the wireless earpieces 302 may utilize to determine an appropriate mode, settings, or enabled functionality. The wireless earpieces 302 and the wireless device 304 may have any number of electrical configurations, shapes, and colors and may include various circuitry, connections, and other components. The wireless earpieces 302 may be shaped and configured as wireless earbuds, wireless headphones, or other headpieces, personal speaker/communications devices, or earpieces any of which may be referred to generally as the wireless earpieces 302.

In one example, the headphones (not shown) may include sensors not within the ear canal. For example, the headphones may include sensors integrated with an over-head support, ear pads/cups, a frame, or so forth. The biometrics may be measured from the user's head (e.g., ears, neck, ears, scalp, skin, etc.) or body. The information may also be associated with the environment, user activity/actions, ambient, or so forth.

The wireless earpieces 302 may include a battery 308, a processor 310, a memory 312, a user interface 314, a physical interface 315, a transceiver 316, and sensors 317. The wireless device 304 may have any number of configurations and include components and features like the wireless earpieces 302. The hub communications functionality and logic may be implemented as part of the processor 310, user interface 314, or other hardware, software, or firmware of the wireless earpieces 302 and/or wireless device 304.

The battery 308 is a power storage device configured to power the wireless earpieces 302. The battery 308 may represent a fuel cell, thermal electric generator, piezo electric charger, solar charger, ultra-capacitor, or other existing or developing power storage technologies. The processor 310 preserves the capacity of the battery 308 by reducing unnecessary utilization of the wireless earpieces 302 in a full-power mode when there is little or no benefit to the user (e.g., the wireless earpieces 302 are sitting on a table or temporarily lost). The battery 308 is preserved for use by the user. As a result, user satisfaction with the wireless earpieces 302 is improved and the user may be able to set the wireless earpieces 302 aside at any moment knowing battery life is automatically preserved by the processor 310 and functionality of the wireless earpieces 302. In addition, the battery 308 may use very little power when additional wireless earpieces or devices (nodes) are not available to limit unnecessary power utilization. Likewise, the power output may be increased when personal area communications or nodes are available. In some embodiments, the wireless earpieces 302 may continue to act as a communications or sensory hub even when not being worn (e.g., placed on a desk, stored in an associated smart charger, etc.). For example, the wireless earpieces 302 may verify biometric information communicated to the wireless earpieces from other sensor-based electronic devices. For example, skin conductivity of the user may be verified by the wireless earpieces 302 based on readings performed by a smart watch/band based on readings and information previously performed by the wireless earpieces 302.

The processor 310 is the logic controlling the operation and functionality of the wireless earpieces 302. The processor 310 may include circuitry, chips, and other digital logic. The processor 310 may also include programs, scripts, and instructions implemented to operate the processor 310. The processor 310 may represent hardware, software, firmware, or any combination thereof. In one embodiment, the processor 310 may include one or more processors. The processor 310 may also represent an application specific integrated circuit (ASIC) or field programmable gate array (FPGA). In one embodiment, the processor 310 may execute instructions to manage the hub communications, verifications, and other processes performed by the wireless earpieces 302.

The processor 310 may utilize measurements from two or more of the sensors 317 to determine whether hub, biometric, or other personal area communications are being requested or otherwise needed. The processor 310 may control actions implemented in response to any number of measurements from external devices (and associated components as well as the sensors 317, the transceiver 316, the user interface 314, or the physical interface 315 as well as user preferences 320 the user entered or other default preferences. For example, the processor 310 may initialize or otherwise perform personal area communications in response to any number of factors, conditions, parameters, measurements, data, values, or other information specified within the processor 310 or by the user preferences 320. For example, hub communications may be utilized in response to received biometrics, communications, or so forth. Wireless personal area networks may also be utilized in response to any number of internal or external measurements, settings, factors, or so forth.

The processor 310 may implement any number of processes for the wireless earpieces 302, such as facilitating communications, listening to music, tracking biometrics or so forth. The wireless earpieces 302 may be configured to work together or completely independently based on the needs of the user. For example, the wireless earpieces 302 may be used by two different users at one time. In another example, the wireless earpieces 302 may offload or load balance tasks and processing between the wireless earpieces. As a result, different processes, task, or actions may be handled by both the wireless earpieces 302, a single wireless earpiece, or so forth.

The processor 310 may also process user input to determine commands implemented by the wireless earpieces 302 or sent to the wireless device 304 through the transceiver 316. Specific actions may be associated with user input (e.g., voice, tactile, orientation, motion, gesture, etc.). For example, the processor 310 may implement a macro allowing the user to associate frequently performed actions with specific commands/input implemented by the wireless earpieces 302.

The processor 310 is circuitry or logic enabled to control execution of an application. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks.

The memory 312 is a hardware element, device, or recording media configured to store data or instructions for subsequent retrieval or access later. The memory 312 may represent static or dynamic memory. The memory 312 may include a hard disk, random access memory, cache, removable media drive, mass storage, or configuration suitable as storage for data, instructions, and information. In one embodiment, the memory 312 and the processor 310 may be integrated. The memory 312 may use any type of volatile or non-volatile storage techniques and mediums. The memory 312 may store information related to the status of a user, wireless earpieces 302, wireless device 304, and other peripherals, such as a tablet, smart glasses, a smart watch, a smart case for the wireless earpieces 302, a wearable device, and so forth. In one embodiment, the memory 312 may display instructions, programs, drivers, or an operating system for controlling the user interface 314 including one or more LEDs or other light emitting components, speakers, tactile generators (e.g., vibrator), and so forth. The memory 312 may also store thresholds, conditions, signal or processing activity, proximity data, and so forth. The memory 312 may store historical information and updated user biometrics. The biometrics stored in the memory 312 may act as baseline or default readings for verifying biometrics measured by devices linked, associated, or otherwise communicating with the wireless earpieces 302.

The transceiver 316 is a component comprising both a transmitter and receiver which may be combined and share common circuitry on a single housing, chip, or board. The transceiver 316 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.), infrared, or other suitable radio frequency standards, networks, protocols, or communications. The transceiver 316 may also be a hybrid or multi-mode transceiver supporting several different communications. For example, the transceiver 316 may communicate with the wireless device 304 or other systems utilizing wired interfaces (e.g., wires, traces, etc.), NFC, or Bluetooth communications as well as with the other wireless earpiece utilizing NFMI. The transceiver 316 may also detect amplitudes and signal strength to infer distance between the wireless earpieces 302 as well as the wireless device 304. The transceiver 316 may also include any number of individual or integrated transmitters and/or receivers.

The components of the wireless earpieces 302 may be electrically connected utilizing any number of wires, contact points, leads, busses, wireless interfaces, or so forth. In addition, the wireless earpieces 302 may include any number of computing and communications components, devices or elements which may include busses, motherboards, printed circuit boards, circuits, chips, sensors, ports, interfaces, cards, converters, adapters, connections, transceivers, displays, antennas, and other similar components. The physical interface 315 is hardware interface of the wireless earpieces 302 for connecting and communicating with the wireless device 304 or other electrical components, devices, or systems.

The physical interface 315 may include any number of pins, arms, or connectors for electrically interfacing with the contacts or other interface components of external devices or other charging or synchronization devices. For example, the physical interface 315 may be a micro USB port. In one embodiment, the physical interface 315 is a magnetic interface automatically coupling to contacts or an interface of the wireless device 304. In another embodiment, the physical interface 315 may include a wireless inductor for charging the wireless earpieces 302 without a physical connection to a charging device. The physical interface 315 may allow the wireless earpieces 302 to be utilized when not worn as a remote microphone and sensor system (e.g., seismometer, thermometer, light detection unit, motion detector, etc.). For example, measurements, such as noise levels, temperature, movement, and so forth may be detected by the wireless earpieces even when not worn. The wireless earpieces 302 may be utilized as a pair, independently, or when stored in a smart case. Each of the wireless earpieces 302 may provide distinct sensor measurements as needed. In one embodiment, the smart case may include hardware (e.g., logic, battery, transceiver, etc.) to integrate as part of a wireless personal area network. For example, the smart case may be utilized as a node or relay within a wireless personal area network for sending and receiving communications.

The user interface 314 is a hardware interface for receiving commands, instructions, or input through the touch (haptics) of the user, voice commands, or predefined motions. The user interface 314 may further include any number of software and firmware components for interfacing with the user. The user interface 314 may be utilized to manage and otherwise control the other functions of the wireless earpieces 302 including personal area communications. The user interface 314 may include the LED array, one or more touch sensitive buttons or portions, a miniature screen or display, or other input/output components (e.g., the user interface 314 may interact with the sensors 317 extensively). The user interface 314 may be controlled by the user or based on commands received from the wireless device 304 or a linked wireless device. In one embodiment, personal area communications may be controlled by the user interface, such as recording communications, receiving user input for communications, queuing communications, sending communications, receiving user preferences for the communications, and so forth. The user interface 214 may also include a virtual assistant for managing the features, functions, and components of the wireless earpieces 302.

In one embodiment, the user may provide user input for the user interface 314 by tapping a touch screen or capacitive sensor once, twice, three times, or any number of times. Similarly, a swiping motion may be utilized across or in front of the user interface 314 (e.g., the exterior surface of the wireless earpieces 302) to implement a predefined action. Swiping motions in any number of directions or gestures may be associated with specific activities or actions, such as play music, pause, fast forward, rewind, activate a virtual assistant, listen for commands, report biometrics, enabled personal area communications, verify biometrics, manage hub communications, and so forth.

The swiping motions may also be utilized to control actions and functionality of the wireless device 304 or other external devices (e.g., smart television, camera array, smart watch, etc.). The user may also provide user input by moving his head in a direction or motion or based on the user's position or location. For example, the user may utilize voice commands, head gestures, or touch commands to change the processes implemented by the wireless earpieces 302 as well as the processes executed, or content displayed by the wireless device 304. The user interface 314 may also provide a software interface including any number of icons, soft buttons, windows, links, graphical display elements, and so forth. In one embodiment, the swiping motions may be utilized to verify biometrics or perform communications for one or more devices associated with a direction of the swipe or other indicator.

The sensors 317 may be integrated with the user interface 314 to detect or measure the user input. For example, infrared sensors positioned against an outer surface of the wireless earpieces 302 may detect touches, gestures, or other input as part of a touch or gesture sensitive portion of the user interface 314. The outer or exterior surface of the user interface 314 may correspond to a portion of the wireless earpieces 302 accessible to the user when the wireless earpieces are worn within the ears of the user.

In addition, the sensors 317 may include pulse oximeters, accelerometers, thermometers, barometers, radiation detectors, gyroscopes, magnetometers, global positioning systems, beacon detectors, inertial sensors, photo detectors, miniature cameras, air microphones, ear-bone microphones, and other similar instruments for detecting user biometrics, environmental conditions, location, utilization, orientation, motion, and so forth. The sensors 317 may provide measurements or data utilized to select, activate, or otherwise utilize the wireless personal area network. Likewise, the sensors 317 may be utilized to awake, activate, initiate, or otherwise implement actions and processes utilizing conditions, parameters, values, or other data within the user preferences 320. For example, the optical biosensors within the sensors 317 may determine whether the wireless earpieces 302 are being worn and when a selected gesture to activate the virtual assistant 318 for verifying biometrics is provided by the user.

The wireless device 304 may include components similar in structure and functionality to those shown for the wireless earpieces 302. The computing device may include any number of processors, batteries, memories, busses, motherboards, chips, transceivers, peripherals, sensors, displays, cards, ports, adapters, interconnects, and so forth. The wireless device 304 may include one or more processors and memories for storing instructions. The instructions may be executed as part of an operating system, application, browser, or so forth to implement the features herein described. The wireless earpieces 302 may be magnetically, wirelessly, or physically coupled to the wireless device 304 to be recharged or synchronized or to be stored. The wireless device 304 may include applications compatible and able to enable wireless personal area network communications. As a result, the separate instances may function as a single application to enhance functionality. The wireless earpieces 302 and wireless device 304 may utilize any number of wireless personal area networks including standards, protocols, devices, and so forth.

The wireless device 304 may be utilized to adjust the user preferences 320 including settings, thresholds, activities, conditions, environmental factors, and so forth utilized by the wireless earpieces 302 and the wireless device 304. For example, the wireless device 304 may utilize a graphical user interface allowing the user to more easily specify any number of conditions, values, measurements, parameters, and factors utilized to perform communications through the wireless personal area network. The user preferences 320 may also specify how biometrics are verified. For example, the user preferences 320 may specify the biometrics utilized (e.g., heart rate, blood pressure, fingerprint, blood chemistry, voice or speech, skin conductivity, etc.), devices authorized to perform biometric and hub communications, and other applicable information, data, and so forth.

The wireless device 304 may also include sensors for detecting the location, orientation, and proximity of the wireless earpieces 302 to the wireless device 304. The wireless earpieces 302 may turn off communications to the wireless device 304 in response to losing a status or heart beat connection to preserve battery life and may only periodically search for a connection, link, or signal to the wireless device 304. The wireless earpieces 302 may also turn off components, enter a low power or sleep mode, or otherwise preserve battery life in response to no interaction with the user for a time, no detection of the presence of the user (e.g., touch, light, conductivity, motion, etc.), or so forth. Biometrics may also be unilaterally or bilaterally verified between the wireless earpieces 302 and the wireless device 304 for added security, verification, communications, or other purposes and processes.

As originally packaged, the wireless earpieces 302 and the wireless device 304 may include peripheral devices such as charging cords, power adapters, inductive charging adapters, solar cells, batteries, lanyards, additional light arrays, speakers, smart case covers, transceivers (e.g., Wi-Fi, cellular, etc.), or so forth. In one embodiment, the wireless earpieces 302 may include a smart case (not shown). The smart case may include an interface for charging the wireless earpieces 302 from an internal battery as well as through a plugged connection. The smart case may also utilize the interface or a wireless transceiver to log utilization, biometric information of the user, and other information and data. The smart case may also be utilized as a repeater as part of the wireless personal area network (e.g., a node in the wireless personal area network), a signal amplifier, relay, or so forth. The smart case may further include sensors or other components as described regarding the wireless earpieces 302.

Figure 4:
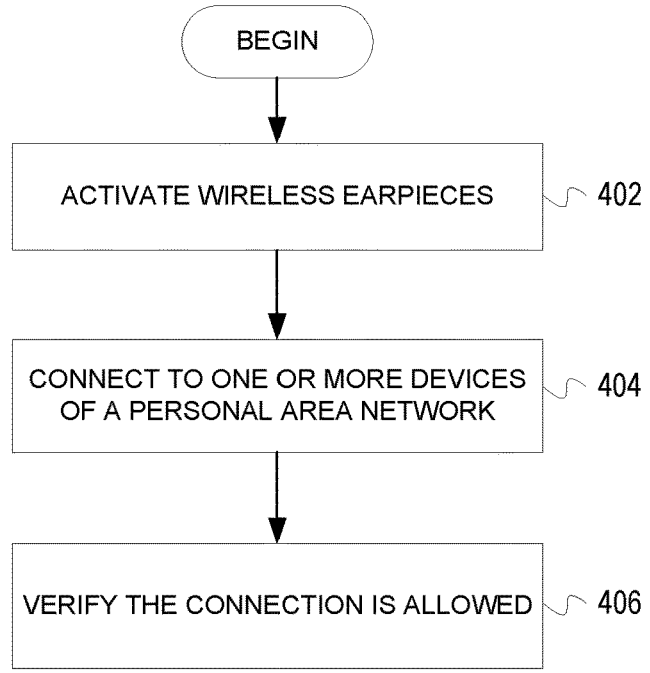
FIG. 4 is a flowchart of a process for verifying a connection in accordance with an embodiment of the present invention.

FIG. 4 is a flowchart of a process for verifying connections in accordance with an embodiment of the present invention. The process of FIGS. 4-6 may be implemented by several wireless earpieces 14 (sets or individual wireless earpieces 14), wireless devices 10, wired devices, or so forth. For example, hub communications may be performed through the wireless earpieces 14. The individual devices 103 may represent nodes in the wireless personal area network 100. In one embodiment, the processes of FIGS. 5 and 6 may be implemented in response to the process of FIG. 4. The wireless earpieces 14 may communicate utilizing any number of signals, protocols, or standards (e.g., Bluetooth, Wi-Fi, NFMI, cellular communications, etc.). The method of FIG. 4 may be implemented by one wireless earpiece, a set of wireless earpieces 14, or wireless earpieces 14 associated with a wireless device 10.

The process of FIG. 4 may begin by activating wireless earpieces 14 (step 402). The wireless earpieces 14 may be activated in response to being removed from a smart charger (not shown) charging the wireless earpieces 14. In another embodiment, the wireless earpieces 14 may be powered on or otherwise activated utilizing a switch, button, or other selection component. The wireless earpieces 14 may be activated in response to determining they are being worn in the ear or ears of a user. The wireless earpieces 14 may also be activated utilizing another wireless device 10 in communication with the wireless earpieces 14 (e.g., mobile application, software 12, user interface, etc.).

Next, the wireless earpieces 14 connect to one or more devices 103 of a personal area network 100 (step 404). The connection of step 404 may include any number of pairing or association processes. For example, Bluetooth pairing be performed between the wireless earpieces 14 and one or more electronic devices 103. In another embodiment, an authorized communication session may be created for applicable devices to connect. Any number of identifiers, including, but not limited to, hardware identifiers, software identifiers, passwords, pin numbers, biometric or so forth may be utilized to connect to the communication session. The one or more devices 103 may represent personal electronics, wearables, gaming devices, smart jewelry, implants, medical equipment, fitness devices, media devices, or any number of other electronic devices.

Next, the wireless earpieces 14 verified the connection is allowed (step 406). The connection may be automatically verified utilizing the information received during step 404. The user may be required to provide input, feedback, instructions, or commands verifying the connection is allowed. Any number of verification and authentication processes may be performed during step 406. For example, connections between the wireless earpieces 14 and the one or more devices 103 may be automatically established in response to previous authorizations, connections, or pairing processes. The wireless earpieces may connect through a signal, link, or connection.

Figure 5:
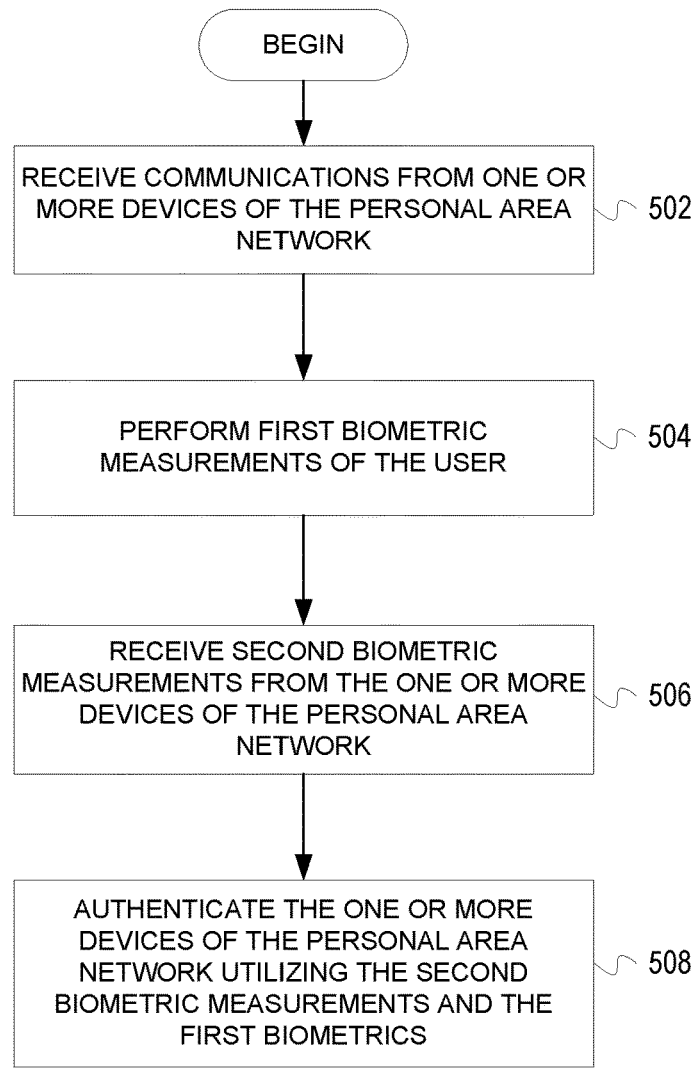
FIG. 5 is a flowchart of a process for authenticating biometrics in accordance with an embodiment of the present invention.

The process of FIG. 5 may be utilized to perform any number of communications, biometric verifications, and connections with devices 103, which have never been connected to wireless earpieces 14, have no "handshake" capability (in telecommunications, a handshake is an automated process of negotiation between two communicating participants through the exchange of information establishing the protocols of a communication link at the start of the communication, before full communication begins. The handshaking process usually takes place to establish rules for communication when a computer attempts to communicate with another device. Signals are usually exchanged between two devices to establish a communication link. For example, when a computer communicates with another device such as a modem, the two devices will signal each other they are switched on and ready to work, as well as to agree to which protocols are being used), or no similar interface.

For example, the communications may represent biometrics, audio, video, text, or tactile input or messages. The communications may represent direct or indirect communications received from the user as well as discrete, real-time, or ongoing communications. In one embodiment, the communication may represent one or several different communications sent to or from several users/devices 103. In one example, the communication may represent a verification and authentication of a smart watch the wireless earpieces 14 may authorize as valid based on synchronicity of detected heart beats. In another example, the communication may represent a detected biometric event, such as an impact beyond a specified threshold, rapid drop or increase in user vitals, or other biometric or environmental conditions, parameter, event, or so forth.

FIG. 5 is a flowchart of a process for communicating with devices 103 which may have no handshake capability with the wireless earpieces and therefore the authenticating occurs through biometrics in accordance with an embodiment of the present invention. The process of FIG. 5 may be performed as part of the process of FIG. 4 or as a separate process. For example, the process of FIG. 4 could be utilized in a situation where wireless earpieces 14 are in a handshake communications environment with any of devices 103. The process of FIG. 5 could be used if none, or a few, of the devices 103 were not in a handshake communications environment with the wireless earpieces 14. The process may begin with the wireless earpieces receiving communications and/or transmitted data from one or more devices 103 of the personal area network 100 (step 502). One embodiment of the process or step is shown in FIG. 4.

The wireless earpieces 14 perform a first biometric measurement of the user at step 504. The first biometric measurements may be performed utilizing any of the sensors 317 of the wireless earpieces 14 (e.g., optical, contact, electrical, accelerometer, gyroscope, magnetometer, GPS, transceiver, beacon, chemical, etc.) to detect the first biometric measurements. The first biometric measurements may indicate a single biometric or a combination of biometric measurements of the user (e.g., heart rate and blood pressure, heart rate and location, etc.).

The wireless earpieces 14 receive a second biometric measurement from the one or more devices 103 of the personal area network 100 at step 506. The second biometric measurements may be received in any number of formats, packets, packages, signals, or so forth. For example, the second biometrics may be received through an established connection, link, or signals or simply received by transceiver 316.

The wireless earpieces 14 begin authenticating the one or more devices 103 of the personal area network 100 utilizing the second biometric measurements and the first biometric measurements at step 508. During step 508 the wireless earpieces may perform analysis or processing to compare the second biometric measurements to the first biometric measurements. A single biometric or multiple biometrics may be utilized to authenticate the one or more devices.

In response to the authentication of step 508, the one or more devices 103 may be authorized to utilize the personal area network 100, access information and resources available through the wireless earpieces 14, perform transactions, implement applications and processes, or perform other allowed activities. User preferences, settings, parameters, or data stored in the wireless earpieces may specify applicable actions and activities for the wireless earpieces.

Wireless earpieces 14 can receive and utilize sensor information from devices 103 which are unverified or not in a handshake relationship with the wireless earpieces 14. The process of FIG. 5 utilizes a "signal-based similarity" to link the wireless earpieces 14 and the devices 103 together in a meshed body area network 100 without requiring a user to do anything. Wireless earpieces 14, or processor 310 compares the first biometric measurement with the second biometric measurement. If the first biometric measurement from the earpieces 14 matches the second biometric measurement from another sensor on one of devices 103, then this indicates the device sensor and the earpiece 14 are being worn by the same person and the wireless earpiece 14 can function as a hub for the other sensor too.

Figure 6:
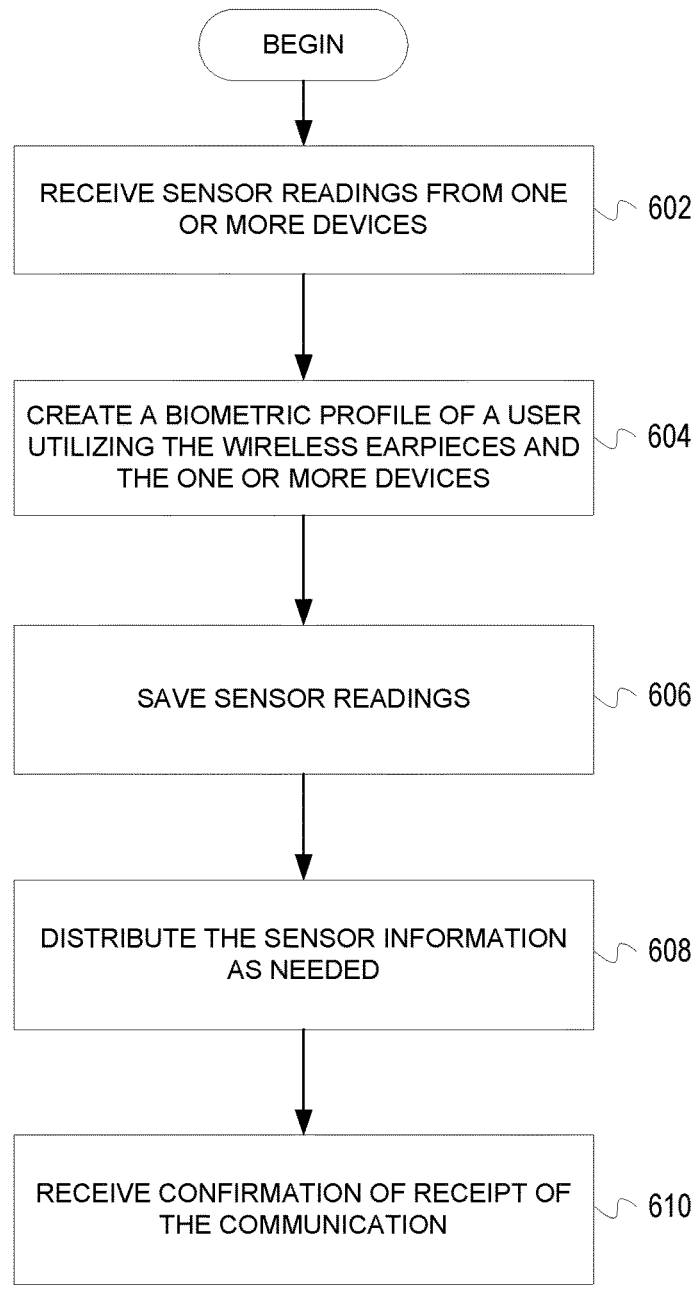
FIG. 6 is a flowchart of a process for managing biometric information in accordance with an embodiment of the present invention.

FIG. 6 is a flowchart of a process for managing biometric information in accordance with embodiments of the present invention. The process of FIG. 6 may be implemented as part of the processes of FIGS. 4-5. The process may begin by receiving sensor readings from one or more devices 103 (step 602). The sensor readings may include biometrics, environmental conditions and information, speed, heading, altitude, location, proximity to the one or more devices 103 or other electronics, user actions or activities, and so forth. The biometrics of step 602 may represent biometrics determined by the wireless earpieces to be unique or distinct sensor readings not read by the wireless earpieces 14 themselves.

The wireless earpieces 14 create a biometric profile of a user utilizing the wireless earpieces 14 and the one or more devices 103 at step 604. The biometric profile may be created utilizing sensor readings from the wireless earpieces 14 and several devices 103 in communication with the wireless earpieces 14. The biometric profile may relate to information related to the user's body, appendages and extremities, and so forth. In one embodiment, the biometric profile may also include information related to tools, equipment, components, vehicles, or other devices worn, ridden by, implanted within, or otherwise utilized by the user.

The wireless earpieces 14 save the sensor readings at step 606. The sensor readings may be saved in a memory 312 of the wireless earpiece 14. The sensor readings may be encrypted, password protected, biometrically protected, or so forth. The sensor readings may be saved in an external device, such as a cell phone 10 or computer 15. The sensor readings may be stored externally to save memory or to generate a more complete biometric profile. The sensor readings may be sent for storage continuously, in bursts, based on a signal/connection availability, or so forth.

The wireless earpieces 14 distribute the sensor information as needed at step 608. The sensor readings may be sent to one or more users, devices 103, systems 102, equipment, or components. For example, the sensor readings may be communicated through a wireless device 10 to an applicable medical, fitness, or personal profile, file, folder, or other location. The sensor readings may be stored in a cloud network, storage, or drive (e.g., cloud storage offered by Google®, Amazon®, Apple®, Dropbox®, Box, Sync®, etc.) for access by multiple parties. For example, the sensor readings may be aggregated as part of a medical profile saved for utilization by the user, the user's spouse, and the user's doctor. The wireless earpieces 14 may include any number of security processes, methodologies, or so forth may be utilized by the wireless earpieces 14 (e.g., encryption, password-protection, device identification, etc.).

The wireless earpieces 14 may receive confirmation of receipt of the communication by the receiving party at state 610. The confirmation may be a delivery receipt, indicator, alert, marker, or other information actively delivered to the user or passively recorded or logged for subsequent review. The confirmation of receipt may be provided to the user of the wireless earpieces 14 when the communication is delivered as specified by the user. In some embodiments, the user may specify alternative communications devices, addresses, or routing for problematic communications (e.g., alternative email addresses, phone numbers, device identifiers, alternative recipients, emergency service personnel, etc.). In some embodiments, the user may select not to receive a delivery confirmation.

Figure 7:
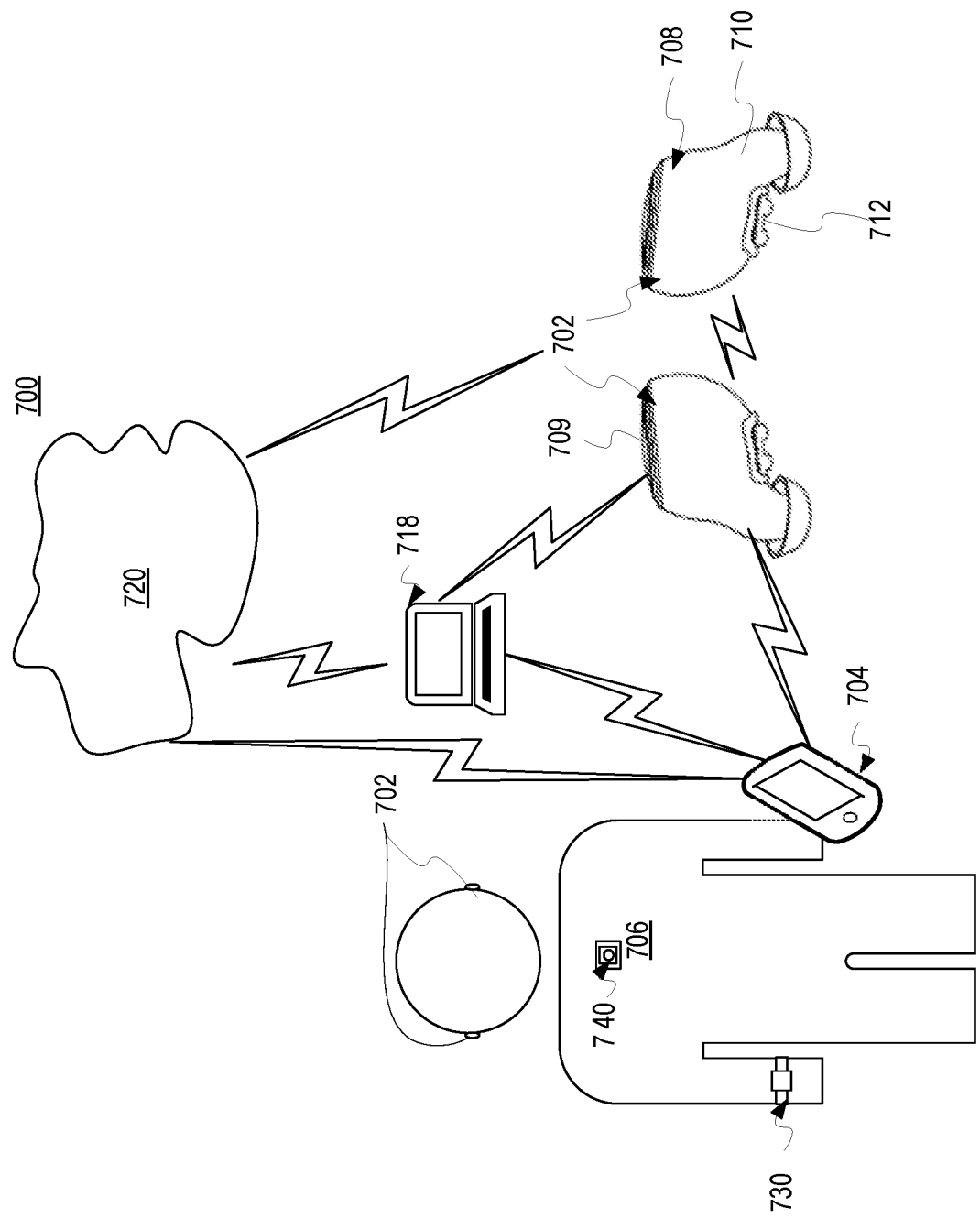
FIG. 7 is a pictorial representation of a computing system in accordance with an embodiment of the present invention.

FIG. 7 is a pictorial representation of a communications environment 700 in accordance with an embodiment of the present invention. The wireless earpieces 702 may be configured to communicate with each other and with one or more wireless devices, such as a wireless device 704 or a personal computer 718 (as well as the associated software 12 including operating systems, kernels, applications, and so forth). The wireless earpieces 702 may be worn by a user 706 and are shown both as worn and separately from their positioning within the ears of the user 706 for purposes of visualization.

The wireless earpieces 702 includes a frame 708 shaped to fit substantially within the ears of the user 706. The frame 708 is a support structure at least partially enclosing and housing the electronic components of the wireless earpieces 702. The frame 708 may be composed of a single structure or multiple interconnected structures (e.g., sonic welding, tape, interference fit, etc.). An exterior portion of the wireless earpieces 702 may include a first set of sensors shown as infrared sensors 709. The infrared sensors 709 may include emitter and receivers detecting and measuring infrared light radiating from objects within its field of view. The infrared sensors 709 may detect gestures, touches, or other user input against an exterior portion of the wireless earpieces 702 visible when worn by the user 706. The infrared sensors 709 may also detect infrared light or motion. The infrared sensors 709 may be utilized to determine whether the wireless earpieces 702 are being worn, moved, approached by a user, set aside, stored in a smart case, placed in a dark environment, or so forth. The infrared sensors 709 may also include a touch screen or touch sensitive portion configured to read fingerprints of the user. The user 706 may configure the wireless earpieces 702 for hub communications including biometric authentication, as discussed above, even when not worn, such as when placed on a desk or table or positioned within a smart case charging, securing, and protecting the wireless earpieces 702 when not in use.

The user 706 can "on-board" sensor arrays from devices 103 which may not exclusively communicate with wireless devices 702. Typically, most sensor arrays met a basic entry criterion for communicating with wireless earpieces 702. However, in the situation where a user may be wearing a device 103 which is not compatible or made by a different manufacturer of the wireless earpieces the user can still obtain sensor data from the device 103.

The frame 708 defines an extension 710 configured to fit substantially within the ear of the user 706. The extension 710 may include one or more speakers or vibration components for interacting with the user 706. The extension 710 may be removably covered by one or more sleeves. The sleeves may be changed to fit the size and shape of the user's ears. The sleeves may come in various interchangeable sizes and may have extremely tight tolerances to fit the user 706 and one or more additional users utilizing the wireless earpieces 702 during their expected lifecycle. In another embodiment, the sleeves may be custom built to support the interference fit utilized by the wireless earpieces 702 while also being comfortable while worn. The sleeves are shaped and configured to not cover various sensor devices of the wireless earpieces 702 or to allow operation through the sleeves where necessary. In other embodiments, the wireless earpieces 702 may be docked with other devices utilized or worn by the user 706, such as watches 730, glasses, headsets, jewelry 740, smart phones 704, personal computers 718, gaming devices, or so forth.

As previously noted, the frame 708 or the extension 710 (or other portions of the wireless earpieces 702) may include sensors 712 for sensing pulse, blood oxygenation, temperature, voice characteristics, skin conduction, glucose levels, impacts, activity level, position, location, orientation, as well as any number of internal or external user biometrics. The sensors 712 may be positioned to contact or be proximate the epithelium of the external auditory canal or auricular region of the user's ears when worn. For example, the sensors 712 may represent various metallic sensor contacts, optical interfaces, or even micro-delivery systems for receiving, measuring, and delivering information and signals. Small electrical charges or spectroscopy emissions (e.g., various light wavelengths) may be utilized by the sensors 712 to analyze the biometrics of the user 706 including pulse, blood pressure, skin conductivity, blood analysis, sweat levels, and so forth. In one embodiment, the sensors 712 may include optical sensors emitting and measuring reflected light within the ears of the user 706 to measure any number of biometrics. The optical sensors may also be utilized as a second set of sensors to determine when the wireless earpieces 702 are in use, stored, charging, or otherwise positioned. The sensors 712 may include an array of components.

The sensors 712 may be utilized to provide a first set of biometric information communicated to the processor and compared against a second set of biometric information to perform authentication and verification of the second set of biometric information (e.g., for authorized hub communications, processes, actions, etc.). The sensors 712 within a body area network 720 on the user's body 706 with no "handshake" capability with a watch 730 or jewelry 740. Sensors on watch 730 or jewelry 740 adjacent to the user 706 might give relevant data or through which better analysis of the collected data could be analyzed and ranked. One example would be an ambient temperature sensor on watch 730 which is in proximity to the user 706. It would be very useful in many cases to capture the ambient temperature of the environment around the body area network 720. This gives a specific frame of reference through which the body area network 720 can be more thoroughly and accurately evaluated and analyzed. Adding additional data to the body area network 720 only assists the user in better optimizing the network 720 and the user's understanding of their biometrics and the environment around them.

As described, the sensors 712 may include one or more microphones integrated with the frame 708 or the extension of the wireless earpieces 702. For example, an external microphone may sense environmental noises as well as the user's voice as communicated through the air of the communications environment 700. The external microphones may sense additional user's voices to perform recordings, analysis, actions, or otherwise facilitate the activities of the user 706. An ear-bone or internal microphone may sense vibrations or sound waves communicated through the head of the user 702 (e.g., bone conduction, etc.).

In some applications, temporary adhesives or securing mechanisms (e.g., clamps, straps, lanyards, extenders, etc.) may be utilized to ensure the wireless earpieces 702 remain in the ears of the user 706 even during the most rigorous or physical activities or to ensure if they do fall out they are not lost or broken. For example, the wireless earpieces 702 may be utilized during marathons, swimming, team sports, biking, hiking, parachuting, or so forth. In one embodiment, miniature straps may attach to the wireless earpieces 702 with a clip on the strap securing the wireless earpieces to the clothes, hair, or body of the user. The wireless earpieces 702 may be configured to play music or audio, receive and make phone calls or other communications, determine ambient environmental conditions (e.g., temperature, altitude, location, speed, heading, etc.), read user biometrics (e.g., heart rate, motion, temperature, sleep, blood oxygenation, voice output, calories burned, forces experienced, etc.), and receive user input, feedback, or instructions. The wireless earpieces 702 may also execute any number of applications to perform specific purposes. The wireless earpieces 702 may be utilized with any number of automatic assistants, such as Siri®, Cortana®, Alexa®, Google®, Watson®, or other smart assistants/artificial intelligence systems.

The communications environment 700 may further include the personal computer 718. The personal computer 718 may communicate with one or more wired or wireless networks, such as a network 720. The personal computer 718 may represent any number of devices, systems, equipment, or components, such as a laptop, server, tablet, transcription system, security system, gaming device, virtual/augmented reality system, or so forth. The personal computer 718 may communicate utilizing any number of standards, protocols, or processes. For example, the personal computer 718 may utilize a wired or wireless connection to communicate with the wireless earpieces 702, the wireless device 704, or other electronic devices. The personal computer 718 may utilize any number of memories or databases to store or synchronize biometric information associated with the user 706, data, passwords, or media content. The personal computer 718 may also include any number of databases. The wireless earpieces 702 may store all or portions of these databases, logic, services, and resources updated regularly as noted above. For example, a database of biometric information, readings, and profiles may be stored and managed for the user 706 and any number of other users utilizing the wireless earpieces 702.

The wireless earpieces 702 may determine their position with respect to each other as well as the wireless device 704 and the personal computer 718. For example, position information for the wireless earpieces 702 and the wireless device 704 may determine proximity of the devices in the communications environment 700. For example, global positioning information or signal strength/activity may be utilized to determine proximity and distance of the devices to each other in the communications environment 700. In one embodiment, the distance information may be utilized to determine whether biometric analysis may be displayed to a user. For example, the wireless earpieces 702 may be required to be within four feet of the wireless device 704 and the personal computer 718 to display biometric readings or receive user input. The transmission power or amplification of received signals may also be varied based on the proximity of the devices in the communications environment 700.

The wireless earpieces 702 and the corresponding sensors 712 (whether internal or external) may be configured to take several measurements or log information and activities during normal usage. This information, data, values, and determinations may be reported to the user 706 or otherwise utilized as part of the software 12 or processor 310, one or both utilizing a communications engine, which can send requests to other devices (103, 104, 704, 718, 740, 730) and aggregates the results into a single list or display them on mobile device 704 according to their source. The sensor measurements may be utilized to extrapolate other measurements, factors, or conditions applicable to the user 706 or the communications environment 700. For example, the sensors 712 may monitor the user's usage patterns or light sensed in the communications environment 700 to enter a full power mode in a timely manner. The user 706 or another party may configure the wireless earpieces 702 directly or through a mobile device 704 and app (e.g., mobile app with a graphical user interface) to set power settings (e.g., preferences, conditions, parameters, settings, factors, etc.) or to store or share biometric information, audio, and other data.

The user may establish the light conditions or motion activating the full power mode or keeping the wireless earpieces 702 in a sleep or low power mode. As a result, the user 706 may configure the wireless earpieces 702 to maximize the battery life based on motion, lighting conditions, and other factors established for the user. For example, the user 706 may set the wireless earpieces 702 to enter a full power mode only if positioned within the ears of the user 706 within ten seconds of being moved, otherwise the wireless earpieces 702 remain in a low power mode to preserve battery life. This setting may be particularly useful if the wireless earpieces 702 are periodically moved or jostled without being inserted into the ears of the user 706.

The wireless earpieces 702 may also be utilized to perform audio or light monitoring of a specified area.

The user 706 or another party may also utilize the wireless device 704 to associate user information and conditions with the user preferences. For example, the user preferences may specify the thresholds and conditions for authenticating other devices utilizing verified user biometrics. The user preferences may also specify actions performed based on the user preferences, such as hub communications, application features, and so forth. In another example, an application executed by the wireless device 704 may be utilized to specify the conditions "waking up" the wireless earpieces 702 to automatically or manually communicate information, warnings, data, or status information to the user. In addition, the enabled functions (e.g., sensors, transceivers, vibration alerts, speakers, lights, etc.) may be selectively activated based on the user preferences as set by default, by the user, or based on historical information. In another embodiment, the wireless earpieces 702 may be adjusted or trained over time to become even more accurate in adjusting to communications needs, activities, habits, requirements, requests, activations, or other processes or functions performed by the software 12, processor 310 one or both utilizing a communications engine. The wireless earpieces 702 may utilize historical information to generate default values, baselines, thresholds, policies, or settings for determining when and how the wireless earpieces 702 (or associated logic/applications) performs various communications, actions, and processes. As a result, the wireless earpieces 702 may effectively manage the automatic and manually performed processes of the wireless earpieces 702 based on automatic detection of events and conditions (e.g., light, motion, user sensor readings, etc.) and user specified settings.

The wireless earpieces 702 may include any number of sensors 712 and logic for measuring and determining user biometrics, such as pulse rate, skin conduction, fingerprints, blood oxygenation, temperature, calories expended, blood or excretion chemistry, voice and audio output (e.g., stress level, amplitude, frequency, etc.), position, and orientation (e.g., body, head, etc.). The sensors 712 may also determine the user's location, position, velocity, impact levels, and so forth. Any of the sensors 712 may be utilized to detect or confirm light, motion, or other parameters affecting how the wireless earpieces 702 manage, utilize, and initialize the software 12. The sensors 712 may also receive user input and convert the user input into commands or selections of the wireless earpieces 702 or made across the personal devices 103 of the wireless personal area network 720. For example, the user input detected by the wireless earpieces 702 may include voice commands, head motions, finger taps, finger swipes, motions or gestures, or other user inputs sensed by the wireless earpieces. The user input may be determined by the wireless earpieces 702 and converted into authorization commands sent to one or more external devices, such as the wireless device 704, the personal computer 718, a tablet computer, or so forth. For example, the user 706 may create a specific head motion and voice command when detected by the wireless earpieces 702 is utilized to send a request to the processor (implemented by the wireless earpiece or wireless earpieces 702/wireless device 704) to perform actions, such as perform wireless personal area network communications, search for nodes, change verification settings, and so forth. Any number of actions may also be implemented by the processor in response to specified user input.

The sensors 712 may make all the measurements regarding the user 706 and communications environment 700 or may communicate with any number of other sensory devices, components, or systems in the communications environment 700. In one embodiment, the communications environment 700 may represent all or a portion of a wireless personal area network 720. The wireless earpieces 702 may be utilized to control, communicate, manage, or interact with many other wearable devices or electronics, such as smart glasses, smart clothing (e.g., socks, shirts, shorts, headbands, undergarments, bands, etc.), medical devices, electronic glass, virtual reality systems, augmented reality systems, heads-up-displays, helmets, smart glass, watches or wrist bands, other wireless earpieces, chest straps, implants, displays, clothing, or so forth. The wireless earpieces 702 may also communicate with cameras, microphones, or other specialized or custom systems, equipment, components, software, or devices. A wireless personal area network is a network for data transmissions among devices, components, equipment, and systems, such as personal computers, communications devices, cameras, vehicles, entertainment/media devices, and communications devices. The wireless personal area network may interact as part of a wireless personal area network and may utilize any number of wired, wireless, or hybrid configurations and may be stationary or dynamic. For example, the wireless personal area network may utilize wireless network protocols or standards, such as INSTEON, IrDA, Wireless USB, Bluetooth, Z-Wave, Zig-Bee, Wi-Fi, ANT+ or other applicable radio frequency signals to communicate as part of a wireless personal area network. In one embodiment, the wireless personal area network may move with the user 706.

The communications environment 700 may include any number of devices, components, or so forth communicating with each other directly or indirectly through a wireless (or wired) connection, signal, or link. The wireless earpieces 702 may function as a hub for communications within the communications environment 700. For example, the wireless earpieces 702 may manage communications, route packets or data, synchronize communications, reformat data, or so forth. The communications environment 700 may include one or more networks and network components and devices represented by the network 720, such as routers, servers, signal extenders, intelligent network devices, towers, antennas, computing devices, or so forth. In one embodiment, the network 720 of the communications environment 700 represents a wireless personal area network as previously disclosed. The wireless earpieces 702 may be utilized for walkie talkie type communications. Voice commands and input may be utilized to control the wireless earpieces 702 as well as tactile or gesture-based input.

As discussed in detail above, it is desirable to bring data into environment 700 which is related to the data collected by sensors 712, but the wireless earpieces 702 are unable to verify as the external devices may not be in a handshake communication protocol with the wireless earpieces 702. Therefore, as in FIG. 5, a "signal-based similarity" can be used to link the devices (103, 104, 704, 718, 740, 730) with the wireless earpieces 702 together in the meshed body area network 720 without requiring the user to do anything. Further, the sensor data can be stored, or stored, authenticated and analyzed at the wireless earpieces 702 with possibility for recommendations/utilizations on made by the wireless earpieces 702. Another option is where the sensor data is transferred to a linked device 704 for storage, authentication, authorization and analysis and recommendations/utilizations are made on the linked device 704 and sent back to the hub 702. The user 706 can be involved by giving permission for the wireless earpieces 702 or mobile device 704 or both to analyze the data. From this point on, the data could be added to a full repository of data from the local body area network 720.

Communications within the communications environment 700 may occur through the network 720, such as a Wi-Fi network, or may occur directly between devices, such as the wireless earpieces 702 and the wireless device 704. In one embodiment, the network 720 represents a wireless personal area network communicating with the wireless earpieces 702 as a set or individually, and may include the wireless device 704, and the computing device 718 (which may also represent nodes of the network 720). The network 720 may communicate with, include, or access a wireless network, such as a Wi-Fi, cellular (e.g., 3G, 4G, 5G, PCS, GSM, etc.), Bluetooth®, short-range radio, satellite, or other short range or long-range radio frequency networks, signals, connections, or links. The network 720 may also include or communicate with any number of hard wired networks, such as local area networks, coaxial networks, fiber-optic networks, powerline networks, or so forth. Communications within the communications environment 700 may be operated by one or more users, service providers, or network providers.

The wireless earpieces 702 may play, display, communicate, or utilize any number of alerts or communications to indicate the actions, activities, communications, mode, or status are in use or being implemented by the wireless earpieces 702. For example, one or more alerts may indicate when additional wireless earpieces are within range of the wireless earpieces 702 utilizing specific tones, verbal acknowledgements, tactile feedback, or other forms of communicated messages. For example, an audible alert and LED flash may be utilized each time the wireless earpieces 702 send or receive communications to an intended recipient/receiving party. Verbal or audio acknowledgements, answers, and actions utilized by the wireless earpieces 702 are particularly effective because of user familiarity with such devices in standard smart phone and personal computers. The corresponding alert may also be communicated to one or more of the users 706, the wireless device 704, and the personal computer 718. In one embodiment, alerts or indicators may be utilized to indicate a message, information, or details are available to a user. For example, an audible alert, such as a beep, and a tactile alert, such as a single vibration, may indicate the wireless earpieces are receiving a communication. At any time, the user 706 may request information regarding the devices communicating with the wireless earpieces 702. For example, the user 706 may swipe a touch-sensitive portion of the wireless earpieces 702 and then when prompted by an audible chirp may ask "what devices am I linked to?" to get the associated information which may be communicated audibly or displayed to the wireless device 704.

In other embodiments, the wireless earpieces 702 may also vibrate, flash, play a tone or other sound, or give other indications of the actions, status, or process of the communications. The wireless earpieces 702 may also communicate an alert to the wireless device 704 showing up as a notification, message, or other indicator indicating changes in status, actions, commands, or so forth.

The wireless earpieces 702 as well as the wireless device 704 may include logic for automatically implementing the communications logic in response to motion, light, audio, user activities, user biometric status, user location, user orientation/position, historical activity/requests, or various other conditions and factors of the communications environment 700. For example, a processor of the wireless earpieces 702 may be activated to perform a specified activity or to "listen" or be prepared to "receive" user input, feedback, or commands for implementation by the wireless earpieces 702. The processor may also go into a recording or logging mode where all content or verbal communications are recorded for subsequent transcription, analysis, review, playback, or so forth.

The wireless device 704 may represent any number of wireless or wired electronic communications or computing devices, such as smart phones, laptops, desktop computers, control systems, tablets, transcription systems, security systems, displays, gaming devices, music players, personal digital assistants, vehicle systems, or so forth as well as the associated software (e.g., operating systems, kernels, applications, etc.). The wireless device 704 may communicate utilizing any number of wireless connections, standards, or protocols (e.g., near field communications, NFMI, Bluetooth, Wi-Fi, wireless Ethernet, etc.). For example, the wireless device 704 may be a touch screen cellular phone communicating with the wireless earpieces 702 utilizing Bluetooth communications. The wireless device 704 may implement and utilize any number of operating systems, kernels, instructions, or applications making use of the available sensor data sent from the wireless earpieces 702. For example, the wireless device 704 may represent any number of android, Apple®/iOS®, Windows®, open platforms, or other systems and devices. Similarly, the wireless device 704 or the wireless earpieces 702 may execute any number of applications utilizing the user input, proximity data, biometric data, and other feedback from the wireless earpieces 702 to initiate, authorize, or process processor processes and perform the associated tasks. In one embodiment, the wireless earpieces 702 and the wireless device 704 may both execute communications engines operating independently or jointly to perform the processes herein described stored locally on each device or accessed through the wireless personal area network. The wireless earpieces 702 may function as a paired set or individually to perform even more communications.

As noted, the layout of the internal components of the wireless earpieces 702 and the limited space available for a product of limited size may affect where the sensors 712 may be positioned. The positions of the sensors 712 within each of the wireless earpieces 702 may vary based on the model, version, and iteration of the wireless earpiece design and manufacturing process. In some embodiments, the wireless earpieces 702 may include limited or no sensors 712. The wireless earpieces 702 may also represent wireless headphones (e.g., on-ear, over-ear, ear fitted, etc.). In another embodiment, the wireless earpieces 702 may be docked with or integrated into a set of wireless headphones.

Figure 8:
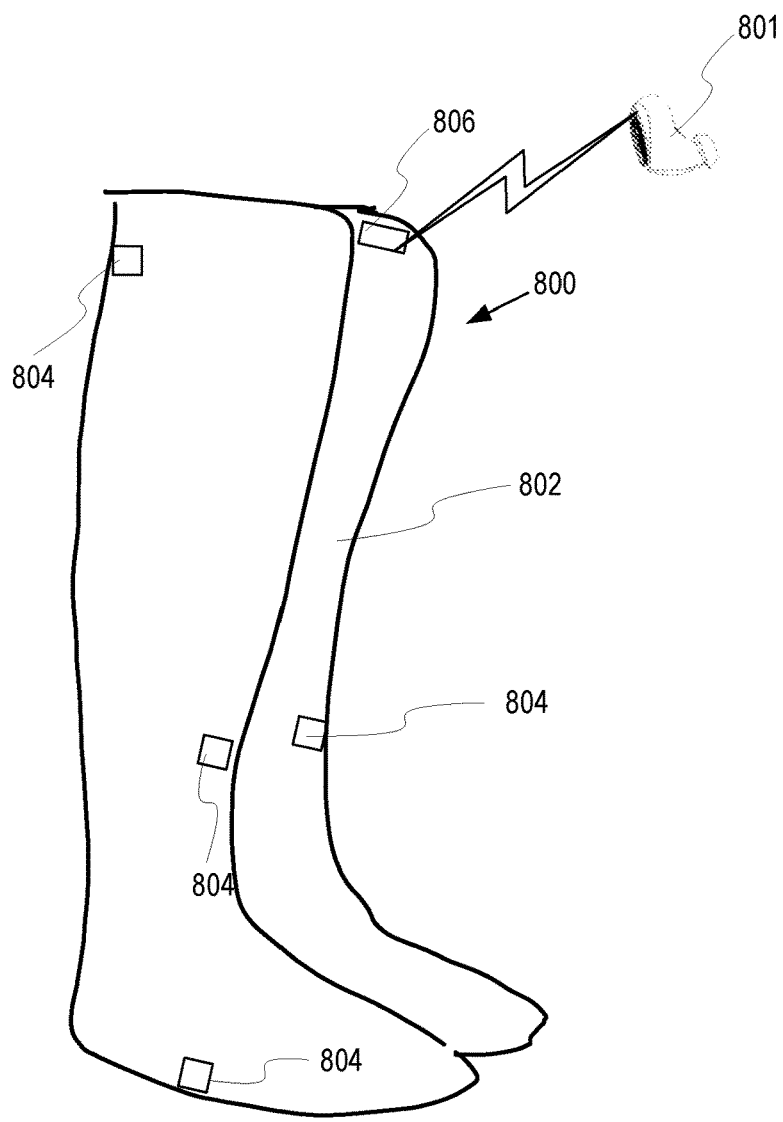
FIG. 8 is a pictorial representation of a smart sock in accordance with an embodiment of the present invention.

FIG. 8 is a pictorial representation of smart socks 800 in accordance with an illustrative embodiment. The smart socks 800 may be of any length from below the ankle to thigh high. The smart socks 800 may be of any size and color required or desired by potential users. Similarly, the smart socks 800 may be formed from any number or combination of fabrics or materials 802 (e.g., cotton, polyester, nylon, wool, acrylic, Lycra, polyethylene, silk, synthetic, Gore-Tex, Gannex, etc.). The smart socks 800 may be configured to communicate with wireless earpieces 801.

In other embodiments, the smart socks 800 may also represent smart shoes including, but not limited to, soles, outsole, vents, traction, upper, lower, heels, heel cap, tongue, toe tip, toe cap, stitches, collar, lining(s), quarter, top piece, vamp, supports, laces, stabilizers, and so forth. The smart socks 800 may also represent nylons, stockings, foot wraps, tabis, or other similar clothing. Alternatively, the smart socks 800 may represent shirts, hats, pants, undergarments, bands (e.g., wrist, ankle, leg, head, waist, etc.).

The materials 802 of the smart socks 800 may represent solid sheets, weaves, knits, compression materials, or any number of structures or patterns as are known in the art. In one embodiment, sensors 804 are integrated with, bonded, adhered, or sewn into the smart socks 800. For example, the smart socks 800 may be an integral portion of the framework of the smart socks 800. In another embodiment, the smart socks 800 may be otherwise glued, adhered, or bonded to the material 802 of the smart socks 800. In one embodiment, the sensors 804 are discrete measurement units measuring biometrics, information, and data associated with a specific portion of the foot/leg of the user. In another embodiment, the sensors 804 may represent threads, fibers, fiber optics, or the materials 802 of the smart sock 800 measuring applicable data and information.

The smart socks 800 may include sensors 804. The sensors 804 may be positioned adjacent various portions of the foot/leg of the user. For example, a portion of the sensors 804 may be placed along the soles of the feet of the user with some of the sensors near the toes and heel of the user. Some of the sensors 804 may also be positioned near the ankle, calves, shins, or knee of the user. The smart socks 800 may be specially configured for specific users, medical treatments/conditions, sports, monitoring, or so forth. The sensors 804 may be positioned around the periphery of the foot and leg of the user. The sensors 804 may communicate with the wireless earpieces 801, a smart phone, a smart watch, a communications network, or other personal electronic device through a transceiver 806. The transceiver 806 may represent a Bluetooth, Wi-Fi, NFMI, or other single mode or multi-mode transceiver.

The sensors 804 may measure heart rate, temperature (e.g., user, shoe, environmental, etc.), blood pressure, circulation, impact forces (e.g., walking or running), speed, cadence, distance run/jogged/walked, jump height, activity level, status of the user, risk levels, skin conductivity, foot/leg stresses and impact levels, bone/skin status, and so forth. In one embodiment, the biometrics read by the smart socks 800 may be sent to a device or network through the transceiver 806. In one embodiment, the smart socks 800 may be utilized by any number of users. The smart socks 800 may be useful for sports, medicine/doctors, hospitals, patients, recreation, and so forth.

The wireless earpieces 801 may utilize audio feedback, tactile feedback, or other output devices to communicate the biometrics and forces sensed by the smart socks 800. In some embodiments, the smart socks 800 or the wireless earpieces 801 may sense conditions, thresholds, or parameters requiring an alert (e.g., high blood pressure, high or low heart rate, etc.). The logic or processors of the smart sock 800 or the wireless earpieces 801 may analyze the measurements to determine an alert or indicator is required based on the thresholds, conditions, or parameters.

The illustrative embodiments may be utilized to perform communications utilizing a wireless personal area network or body area network. The wireless earpieces 801 may operate as a hub for communications and may also be utilized as the sending, receiving, or intermediary nodes of the wireless personal area network. The communications sent may represent discrete, streaming, real-time, saved, or any number of other messages, communications, data, or signals. The communications may be sent utilizing any number of standards, protocols, signals, or so forth. The personal area communications may be utilized for proximity communications, all user communications, emergency communications, out-of-network communications, or so forth. For example, devices may be authenticated by comparing user biometrics before communications with the associated device may be allowed. The biometrics may specify a single user or multiple users that may be utilizing the personal area network at any given time.

A smart sock system communicates with wireless earpieces. The smart sock may include one or more sensors, batteries, transceivers, logic or processors, or other components. In one embodiment, the smart socks may be waterproof or water resistant to wash or otherwise clean the smart socks. In another embodiment, the smart socks may include interchangeable or removable components removed, exchanged, traded-out, replaced, or so forth. The components may be removed for washing, repairs, different users/needs, different activities, and so forth. For example, the battery of the smart socks may include connectors (e.g., plus, ports, interfaces, etc.) for powering components, such as the sensors, transceiver, and logic. In one embodiment, all or portions of the components may be integrated, such as a sensor, the battery, the transceiver, and logic.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or another communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wireless personal area network (WPAN), or a wide area network (WAN), or the connection may be made to an external computer (e.g., through the Internet using an Internet Service Provider).

Figure 9:
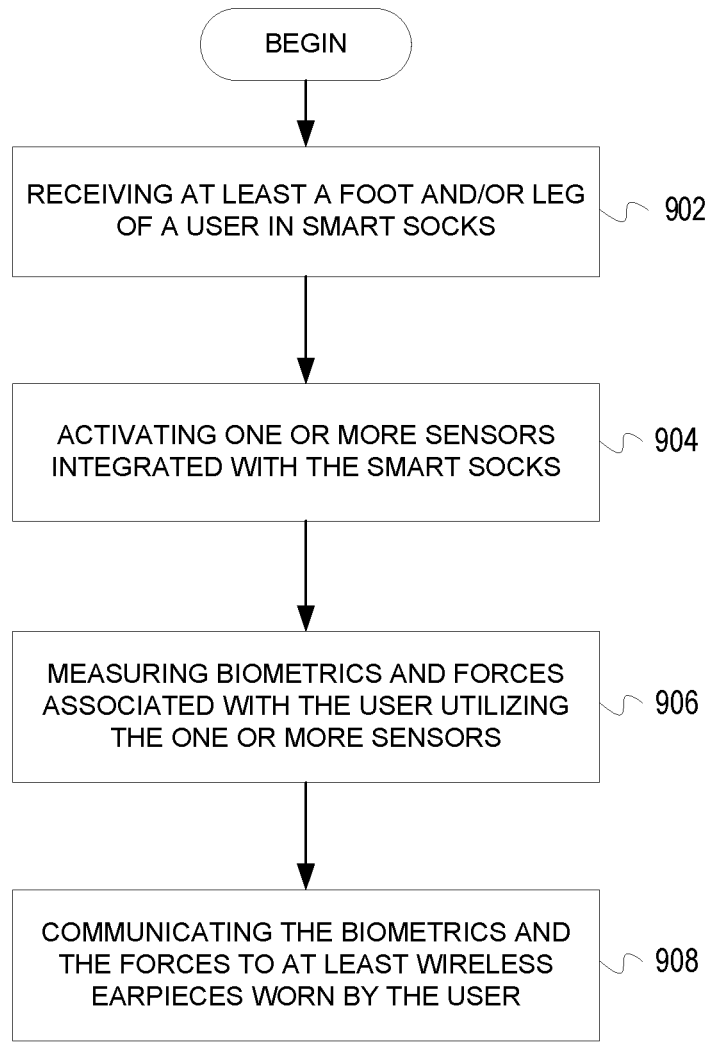
FIG. 9 is a flowchart of a process for utilizing a smart sock system in accordance with an embodiment of the present invention.

FIG. 9 is a flowchart of a process for utilizing a smart sock system in accordance with an illustrative embodiment. The process of FIG. 9 may be performed by one or more smart socks (e.g., a pair of smart socks) communicating with one or more wireless earpieces (e.g., a left and right pair of wireless earpieces). The smart socks may include multiple sensors for measuring user information, biometrics, and forces, a transceiver connected to the multiple sensors for communicating the information, biometrics, and forces, and other components, such as logic for processing the data and information, a battery, piezo electric generators, or solar cells, for powering the smart sock and associated components and so forth. The components may include wires, busses, traces, contacts, interfaces, or other components. The components of the smart sock may be fluid and water resistant as well as impact resistant.

The process may begin by receiving at least a foot and/or leg of a user in smart socks (step 902). The smart socks may cover all or portions of the user's toes, feet, and legs. The smart socks may also represent any number of clothing items (e.g., shirts, pants, shoes, belts, headbands, wrist bands, etc.). The smart socks may be pre-fitted or formed of stretchable or form fitting materials.

Next, the smart socks activate the one or more sensors integrated with the smart socks (step 904). In one embodiment, the smart socks may include a power button, switch, or so forth for activating the electrical features of the smart socks. In another embodiment, the smart socks may detect when being worn to automatically activate the various features and functions.

Next, the smart socks measure biometrics and forces associated with the user utilizing the one or more sensors (step 906). The sensors may include a blood pressure cuff for measuring the blood pressure of the user. The sensors may also include any number of contacts, touch, electrical, chemical, optical, or other sensors for measuring heart rate, blood chemical content, circulation, impact levels, and so forth. In one embodiment, different sensors may measure distinct biometrics and forces (e.g., external, atmospheric, etc.).

Next, the smart socks communicate the biometrics and the forces to at least wireless earpieces worn by the user (step 908). In one embodiment, the smart socks may communicate directly with the wireless earpieces utilizing any number of signals, protocols, or standards. In another embodiment, the smart socks may communicate through one or more devices or networks. For example, the smart socks may utilize a personal mesh network to perform communications of the biometrics and forces.

In another embodiment, the smart sock system may communicate the biometrics and forces to the user audibly, visually, or tactilely through the wireless earpieces or one or more wireless devices in communication with the smart socks. The smart socks may also communicate alerts, alarms, indicators, or other information to the user or other interested parties.

The features, steps, and components of the illustrative embodiments may be combined in any number of ways and are not limited specifically to those described. The illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, the disclosure accomplishes at least all the intended objectives.

The previous detailed description is of a small number of embodiments for implementing the invention and is not intended to be limiting in scope. The following claims set forth several the embodiments of the invention disclosed with greater particularity.

What is claimed is:

1. A method of utilizing a wearable device for hub communications, comprising:
    activating the wearable device;
    forming a wireless communications connection between one or more devices and the wearable device;
    performing first biometric measurements of a user at the wearable device;
    receiving second biometric measurements from the one or more devices, each of the second biometric measurements taken by the one or more devices;
    determining at the wearable device if the one or more devices is located on the same user as the wearable device by comparing the second biometric measurements to the first biometric measurements;
    receiving at the wearable device data from at least one external device not located on the user;
    distributing the first biometric measurements of the user, the second biometric measurements of the user and the data from the at least one external device from the wearable device over a communications network to at least one location.

2. The method of claim 1, further comprising:
    receiving a communication to be sent through the wearable device from the one or more devices; and
    sending the communication to reach a receiving party in response to the determination the second biometric measurements are like the first biometric measurements.

3. The method of claim 1, wherein the wearable device and the one or more devices are part of a personal area network utilized by the user.

4. The method of claim 1, wherein the connecting is performed in response to verifying a connection between the wearable device and the one or more devices is allowed.

5. The method of claim 1, wherein the first biometric measurement and the second biometric measurement are of a same type of biometric measurement.

6. The method of claim 1, wherein the wearable device communicates with a plurality of the one or more devices at a time.

7. The method of claim 1, wherein the wearable device functions as a hub for the one or more devices.

8. The method of claim 1, wherein the first biometric measurement and the second biometric measurement is a heart rate.

9. The method of claim 1, wherein the determining is performed by comparing the first biometric measurement to the second biometric measurement to determine both are associated with the user.

10. The method of claim 1, wherein the connection is a Bluetooth connection.

11. The method of claim 2, wherein the communication includes real-time communications.

12. The method of claim 2, wherein the communication includes discrete messages.

13. The method of claim 1 wherein the wearable device comprises a microphone and wherein the first biometric measurements are performed using the microphone.

14. A wearable device, comprising:
    at least one microphone;
    a processor for executing an application;
    a memory for storing the application, wherein the application is executed to:
    activate the wearable device, wirelessly connect one or more devices to the wearable device,
    perform first biometric measurements of the user utilizing the wearable device, receive second biometric measurements from the one or more devices, determine if the second biometric measurements and the first biometric measurements are similar, receive data from at least one external device not located on the user, and distribute the first biometric measurements of the user, the second biometric measurements of the user and the data from the at least one external device from the wearable device over a communications network to a plurality of locations.

15. The wearable device of claim 14, wherein the processor receives a communication from the one or more devices to be sent through the wearable device as a hub, and wherein the communication is sent in response to the determination the first biometric measurement and the second biometric measurement are similar.

16. The wearable device of claim 14, wherein the wireless earpiece and the one or more devices are part of a personal area network utilized by the user, wherein the first biometric measurement and the second biometric measurement are of a same type of biometric measurement, and wherein the first biometric measurement is compared against the second biometric measurement to determine both as are associated with the user.

17. The wearable device of claim 14, wherein the second biometric measurement is taken by smart clothing worn by the user.

18. The wearable device of claim 14 further comprising a speaker operatively connected to the processor.

19. The wearable device of claim 18 wherein the wearable device is a set of wireless earpieces.

* * * * *